US012810800B2

(12) United States Patent
Eom et al.

(10) Patent No.: US 12,810,800 B2
(45) Date of Patent: Nov. 24, 2026

(54) PIXEL DRIVING CIRCUIT, ELECTRONIC DEVICE INCLUDING THE SAME, AND METHOD FOR DRIVING ELECTRONIC DEVICE

(71) Applicant: Samsung Display Co., Ltd., Yongin-si (KR)

(72) Inventors: Cheolhwan Eom, Yongin-si (KR); Doyeong Kang, Yongin-si (KR); Hyeonwoong Kang, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/270,928

(22) Filed: Jul. 16, 2025

(65) Prior Publication Data

US 2026/0120634 A1    Apr. 30, 2026

(30) Foreign Application Priority Data

Oct. 31, 2024 (KR) ........................ 10-2024-0152554

(51) Int. Cl.
*G09G 3/3233* (2016.01)
*G09G 3/20* (2006.01)

(52) U.S. Cl.
CPC ......... *G09G 3/3233* (2013.01); *G09G 3/2007* (2013.01); *G09G 2300/0819* (2013.01); *G09G 2300/0852* (2013.01); *G09G 2300/0861* (2013.01); *G09G 2310/08* (2013.01); *G09G 2320/045* (2013.01); *G09G 2320/0626* (2013.01)

(58) Field of Classification Search
CPC ........... G09G 3/3233; G09G 2320/045; G09G 2320/0626
See application file for complete search history.

(56) References Cited

U.S. PATENT DOCUMENTS

| | | | | |
|---|---|---|---|---|
| 11,043,173 | B1 | 6/2021 | Zhang | |
| 2019/0206334 | A1* | 7/2019 | Lee | G09G 3/3233 |
| 2022/0044634 | A1* | 2/2022 | Ka | G09G 3/3258 |
| 2025/0246144 | A1* | 7/2025 | Seong | G09G 3/3233 |
| 2025/0273146 | A1* | 8/2025 | Shin | G09G 3/3233 |

* cited by examiner

*Primary Examiner* — Yuzhen Shen
(74) *Attorney, Agent, or Firm* — Sughrue Mion, PLLC

(57) ABSTRACT

Provided is a method for driving an electronic device. The electronic device includes a display panel including a pixel driving circuit, the pixel driving circuit including a driving transistor and a switching transistor to receive a data voltage, and a light emitting element, to operate in a first brightness characteristic and a second brightness characteristic. The method includes determining an initializing voltage corresponding to the first brightness characteristic; determining a first initializing voltage to be provided to a gate electrode of the driving transistor in the first brightness characteristic, by compensating for the initializing voltage based on a margin voltage; determining a second initializing voltage to be provided to the gate electrode of the driving transistor in the first brightness characteristic, based on the first initializing voltage and a driving condition; and providing the first initializing voltage and the second initializing voltage to the display panel.

14 Claims, 11 Drawing Sheets

PIXEL DRIVING CIRCUIT, ELECTRONIC DEVICE INCLUDING THE SAME, AND METHOD FOR DRIVING ELECTRONIC DEVICE

CROSS-REFERENCE TO RELATED APPLICATION

This application is based on and claims priority under 35 U.S.C. § 119 to Korean Patent Application No. 10-2024-0152554, filed on Oct. 31, 2024, in the Korean Intellectual Property Office, the disclosures of which are herein incorporated by reference in their entireties.

BACKGROUND

Embodiments of the present disclosure relate to a pixel driving circuit, capable of preventing display quality from being lowered, an electronic device including the same, and a method for driving the electronic device.

An organic light emitting display device among display devices may display an image by using an organic light emitting diode that generates a light through recombination of electrons and holes. The organic light emitting display device may provide a fast response speed and a low power consumption.

The organic light emitting display device may include pixels connected to data lines and scan lines. Each of the pixels may generally include an organic light emitting diode and a circuit unit to control an amount of current flowing to the organic light emitting diode. The organic light emitting diode may generate a light having a specific brightness corresponding to an amount of a current received from the circuit unit.

SUMMARY

Embodiments of the present disclosure provide a pixel driving circuit, capable of preventing display quality from being degraded, an electronic device including the same, and a method for driving the electronic device.

According to an aspect of an example embodiment of the present disclosure, provided is a method for driving an electronic device including a display panel and a light emitting element, the display panel including a pixel driving circuit, which includes a driving transistor and a switching transistor to receive a data voltage, the method including: determining an initializing voltage corresponding to a first brightness characteristic; determining a first initializing voltage to be provided to a gate electrode of the driving transistor in the first brightness characteristic, by compensating for the initializing voltage based on a margin voltage; determining a second initializing voltage to be provided to the light emitting element in the first brightness characteristic, based on the first initializing voltage and a driving condition; and providing the first initializing voltage and the second initializing voltage to the display panel.

According to an aspect of an example embodiment of the present disclosure, provided is an electronic device including: a display panel including a plurality of pixels, wherein at least one pixel of the plurality of pixels includes: a light emitting element; and a pixel driving circuit connected to the light emitting element, wherein the pixel driving circuit includes: a first transistor including a gate electrode connected to a first node, a first electrode connected to a first power line to provide a first driving voltage, and a second electrode connected to a second node; a second transistor including a gate electrode connected to a first scan line to provide a first scan signal, a first electrode connected to a data line, and a second electrode connected to the first node; a first capacitor connected between the first node and the second node; a second capacitor connected between the first power line and the second node; a third transistor including a gate electrode connected to a second scan line to provide a second scan signal different from the first scan signal, a first electrode connected to a first voltage line to provide a first initializing voltage, and a second electrode connected to the first node; and a fourth transistor including a gate electrode connected to a third scan line to provide a third scan signal different from the first scan signal and the second scan signal, a first electrode connected to the light emitting element, and a second electrode connected to a second voltage line to provide a second initializing voltage, wherein the first initializing voltage is determined by compensating for a voltage level, which is determined with respect to a minimum brightness for expressing black in a first brightness characteristic, based on a margin voltage, and wherein the second initializing voltage is determined based on the first initializing voltage and a driving condition.

According to an aspect of an example embodiment of the present disclosure, provided is a pixel driving circuit including: a first transistor including a gate electrode connected to a first node, a first electrode connected to a first power line to provide a first driving voltage, and a second electrode connected to a second node; a second transistor including a gate electrode connected to a first scan line to provide a first scan signal, a first electrode connected to a data line, and a second electrode connected to the first node; a first capacitor connected between the first node and the second node; a second capacitor connected between the first power line and the second node; a third transistor including a gate electrode connected to a second scan line to provide a second scan signal different from the first scan signal, a first electrode connected to a first voltage line to provide a first initializing voltage, and a second electrode connected to the first node; and a fourth transistor including a gate electrode connected to a third scan line to provide a third scan signal different from the first scan signal and the second scan signal, a first electrode connected to a third node, and a second electrode connected to a second voltage line to provide a second initializing voltage, wherein the first initializing voltage is determined by compensating for a voltage level, which is determined with respect to a minimum brightness for expressing black, based on a margin voltage, and wherein the second initializing voltage is determined based on the first initializing voltage and a driving condition.

BRIEF DESCRIPTION OF DRAWINGS

The above and other objects and features of the present disclosure will become apparent by describing in detail embodiments thereof with reference to the accompanying drawings.

DETAILED DESCRIPTION

Figure 1:
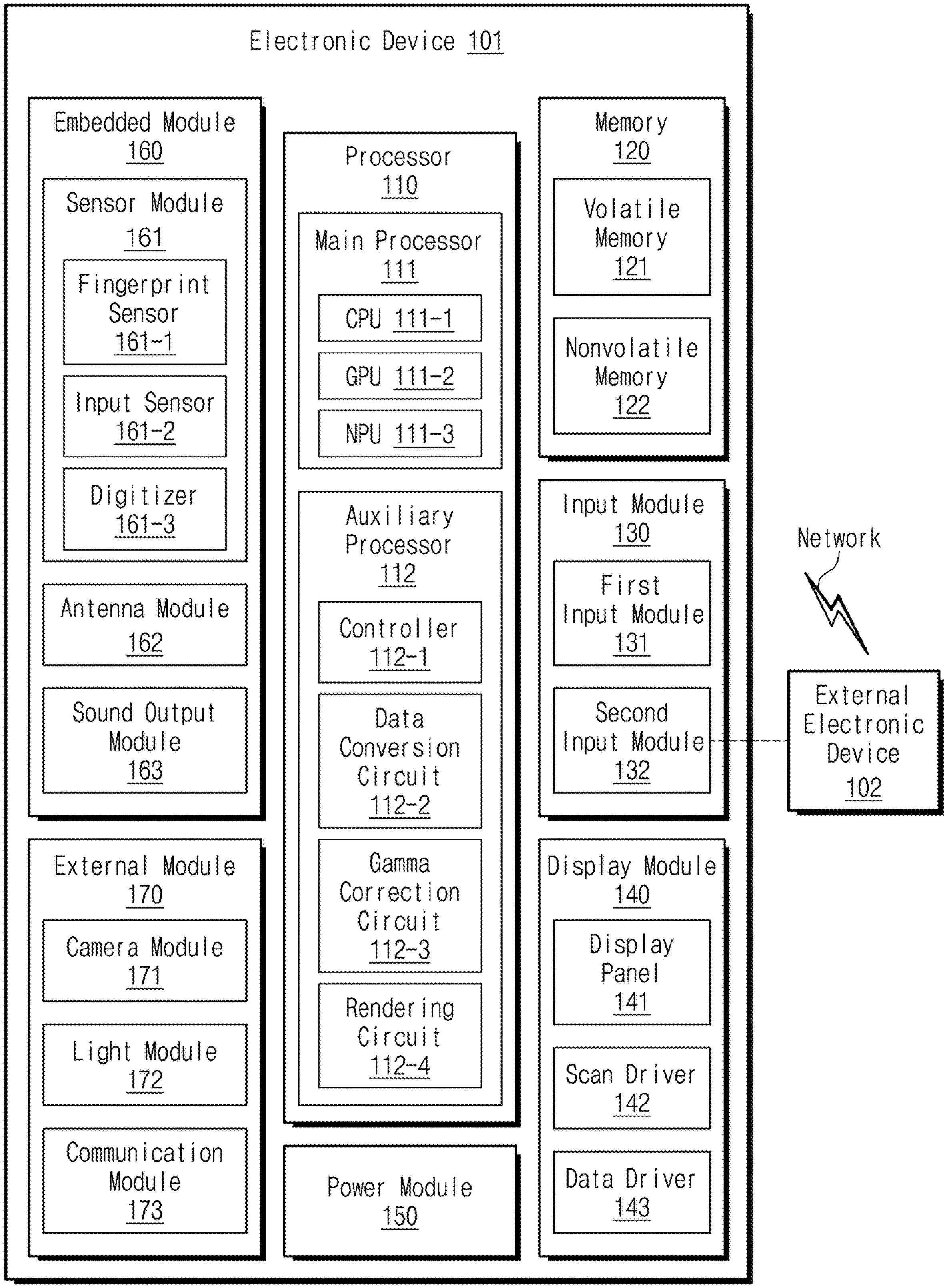
FIG. 1 is a block diagram illustrating an electronic device according to an embodiment of the present disclosure.

Hereinafter, various embodiments will be described in detail with reference to the accompanying drawings.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

In the specification, the expression that a first component (or region, layer, or part) is "on", "connected to", or "coupled to" a second component refers to that the first component is directly on, connected to, or coupled to the second component or refers to that a third component is interposed therebetween.

The same reference numeral will be assigned to the same component. In addition, in drawings, thicknesses, proportions, and dimensions of components may be exaggerated to describe the technical features effectively. The term "and/or" includes any and all combinations of one or more of associated components. As used herein, an expression "at least one of" preceding a list of elements modifies the entire list of the elements and does not modify the individual elements of the list. For example, an expression, "at least one of a, b, and c" (or "at least one of a, b, or c") should be understood as including only a, only b, only c, both a and b, both a and c, both b and c, or all of a, b, and c.

Although the terms "first", or "second" may be used to describe various components, the components should not be construed as being limited by the terms. The terms are only used to distinguish one component from another component. For example, without departing from the scope and spirit of the present disclosure, a first component may be referred to as a second component, and similarly, the second component may be referred to as the first component. The singular forms are intended to include the plural forms unless the context clearly indicates otherwise.

In addition, the terms "under", "at a lower portion", "above", "an upper portion" are used to describe the relationship between components illustrated in drawings. The terms are relative and will be described with reference to a direction indicated in the drawing.

It will be further understood that the terms "comprise," "include," or "including," or "have" or "having" specify the presence of stated features, numbers, steps, operations, components, parts, or the combination thereof, but do not preclude the presence or addition of one or more other features, numbers, steps, operations, components, components, and/or the combination thereof.

The terms "part" and "unit" refer to a software component or a hardware component to perform a specific function. The hardware component may include field-programmable gate array (FPGA) or an application-specific integrated circuit (ASIC). The software component may refer to an executable code and/or data used by the executable code in an addressable storage medium. Accordingly, software components may be, for example, object-oriented software components, class components, and task components, and may include processes, functions, properties, procedures, subroutines, program code segments, driver data, firmware, microcodes, circuits, data, database, data structures, tables, arrangements or variables.

Unless defined otherwise, all terms (including technical terms and scientific terms) used in the specification have the same meaning as commonly understood by one skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the present disclosure will be described with reference to drawings.

FIG. 1 is a block diagram illustrating an electronic device according to an embodiment of the present disclosure.

Referring to FIG. 1, according to an embodiment, an electronic device 101 may include a processor 110, a memory 120, an input module 130, a display module 140, a power module 150, an embedded module 160, and an external module 170. The electronic device 101 may output a variety of information through the display module 140 in an operating system. When the processor 110 executes an application stored in the memory 120, the display module 140 may provide a user with application information through a display panel 141.

The processor 110 may obtain an external input through the input module 130 or a sensor module 161 and executes an application corresponding to the external input. For example, when the user selects a camera icon displayed on the display panel 141, the processor 110 may obtain a user input through an input sensor 161-2 and activate a camera module 171. The processor 110 may transfer image data corresponding to a captured (e.g., photographed) image obtained through the camera module 171 to the display module 140. The display module 140 may display an image corresponding to the captured image through the display panel 141.

As another example, when authentication for personal information is performed in the display module 140, a fingerprint sensor 161-1 may obtain input fingerprint information as input data. The processor 110 may compare the input data obtained through the fingerprint sensor 161-1 with authentication data stored in the memory 120 and execute an application depending on a comparison result. The display module 140 may display information executed depending on logic of the application, through the display panel 141.

As another example, when the user selects a music streaming icon displayed on the display module 140, the processor 110 may obtain the user input through the input sensor 161-2 and activate a music streaming application stored in the memory 120. When a music play command is input to the music streaming application, the processor 110 may activate a sound output module 163 and provide the user with sound information corresponding to the music play command.

The operation of the electronic device 101 has been briefly described above. Below, a configuration of the electronic device 101 will be described in detail. Some of components of the electronic device 101 may be implemented integrally into one component, and one component may be divided into two or more components. According to an embodiment, the electronic device 101 may not include at least one of the above-described components and/or may further include at least one different component. According to an embodiment, some of the above components (e.g., the sensor module 161, an antenna module 162, or the sound output module 163) may be integrated into any other component (e.g., the display module 140).

The electronic device 101 may communicate with an external electronic device 102 over a network (e.g., a short-range wireless communication network or a long-range wireless communication network).

The processor 110 may execute software to control at least one component (e.g., a hardware or software component) of the electronic device 101 connected to the processor 110 and may perform various data processing or operations. According to an embodiment, as at least a part of the data processing or operations, the processor 110 may store a command or data received from any other component (e.g., the input module 130, the sensor module 161, or a communication module 173) in a volatile memory 121, may process the command or data stored in the volatile memory 121, and may store the processed data in a nonvolatile memory 122.

The processor 110 may include a main processor 111 and an auxiliary processor 112. The main processor 111 may include at least one of a central processing unit (CPU) 111-1 or an application processor (AP). The main processor 111 may further include at least any one of a graphic processing unit (GPU) 111-2, a communication processor (CP), and an image signal processor (ISP). The main processor 111 may further include a neural processing unit (NPU) 111-3. The neural processing unit 111-3 may be a processor specialized for processing of an artificial intelligence model, and the artificial intelligence model may be created through machine learning. The artificial intelligence model may include a plurality of artificial neural network layers. The artificial neural network may include one of a deep neural network (DNN), a convolutional neural network (CNN), a recurrent neural network (RNN), a restricted boltzmann machine (RBM), a deep belief network (DBN), a bidirectional recurrent deep neural network (BRDNN), a deep Q-network, or a combination of at least two thereof, but the present disclosure is not limited thereto. Additionally or alternatively, the artificial intelligence model may include a software structure in addition to a hardware structure. At least two of the above processing units and/or processors may be implemented integrally into one component (e.g., a single chip), or each of the above processing units and/or processors may be implemented in a form of an independent component (e.g., a plurality of chips).

The auxiliary processor 112 may include a controller 112-1. The controller 112-1 may include an interface conversion circuit and a timing control circuit. The controller 112-1 may receive an image signal from the main processor 111 and output image data obtained by converting a data format of the image signal to conform to a specification of an interface with the display module 140. The controller 112-1 may output various kinds of control signals for driving the display module 140.

The auxiliary processor 112 may further include a data conversion circuit 112-2, a gamma correction circuit 112-3, and a rendering circuit 112-4. The data conversion circuit 112-2 may receive image data from the controller 112-1, and may compensate for the image data such that an image is displayed with a desired brightness depending on a characteristic of the electronic device 101 or user settings or may convert the image data to reduce a power consumption or to compensate for an afterimage. The gamma correction circuit 112-3 may convert the image data or a gamma reference voltage such that an image displayed on the electronic device 101 has a desired gamma characteristic. The rendering circuit 112-4 may receive the image data from the controller 112-1 and may render the image data in consideration of a pixel arrangement of the display panel 141 applied to the electronic device 101. At least one of the data conversion circuit 112-2, the gamma correction circuit 112-3, and the rendering circuit 112-4 may be integrated into any other component (e.g., the main processor 111 or the controller 112-1). At least one of the data conversion circuit 112-2, the gamma correction circuit 112-3, and the rendering circuit 112-4 may be integrated into a data driver 143 to be described later.

The memory 120 may store various data used by at least one component (e.g., the processor 110 or the sensor module 161) of the electronic device 101 and input data or output data for a command related thereto. The memory 120 may include at least one of the volatile memory 121 and the nonvolatile memory 122.

The input module 130 may receive a command or data to be used by a component (e.g., the processor 110, the sensor module 161, or the sound output module 163) of the electronic device 101 from an outside of the electronic device 101 (e.g., the user or the external electronic device 102).

The input module 130 may include a first input module 131 to receive a command or data from the user and a second input module 132 to receive a command or data input from the external electronic device 102. The first input module 131 may include, for example but not limited to, a microphone, a mouse, a keyboard, a key (e.g., a button), or a pen (e.g., a passive pen or an active pen). The second input module 132 may support a specified protocol capable of connecting to the external electronic device 102 by wire and/or wirelessly. According to an embodiment, the second input module 132 may include, for example but not limited to, a high definition multimedia interface (HDMI), a universal serial bus (USB) interface, a secure digital (SD) card interface, or an audio interface. The second input module 132 may include a connector, such as an HDMI connector, a USB connector, an SD card connector, or an audio connector (e.g., a headphone connector), which is capable of being physically connected to the external electronic device 102.

The display module 140 may visually provide information to the user. The display module 140 may include the display panel 141, a scan driver 142, and the data driver 143. The display module 140 may further include a window, a chassis, and a bracket to protect the display panel 141.

The display panel 141 may include a liquid crystal display panel, an organic light emitting display panel, or an inorganic light emitting display panel, and a type of the display panel 141 is not particularly limited. The display panel 141 may be of a rigid type or may be of a flexible type capable of being rolled or folded. The display module 140 may further include a supporter supporting the display panel 141, a bracket, or a heat radiation member.

The scan driver 142 serving as a driving chip may be mounted on the display panel 141. In addition, the scan driver 142 may be integrated into the display panel 141. For example, the scan driver 142 may include an amorphous silicon TFT gate (ASG) driver circuit, a low temperature polycrystalline silicon (LTPS) TFT gate driver circuit, or an oxide semiconductor (OSG) TFT gate driver circuit provided in the display panel 141. The scan driver 142 may receive a control signal from the controller 112-1, and output scan signals to the display panel 141 in response to the control signal.

The display panel 141 may further include a light emitting driver. The light emitting driver may output a light emitting control signal to the display panel 141, in response to the control signal received from the controller 112-1. The light emitting driver may be formed separately from the scan driver 142 or may be integrated into the scan driver 142.

The data driver 143 may receive a data control signal from the controller 112-1. After converting image data into an analog voltage (e.g., a data voltage) in response to the data control signal, the data driver 143 may output the converted analog voltage to the display panel 141.

The data driver 143 may be integrated into another component (e.g., the controller 112-1). The functions of the interface conversion circuit and the timing control circuit of the controller 112-1 described above may be integrated into the data driver 143.

The display module 140 may further include a light emitting driver, and a voltage generation circuit. The voltage generation circuit may output various types of voltages for driving the display panel 141.

The power module 150 may supply a power to the components of the electronic device 101. The power module 150 may include a battery which charges a power supply voltage. The battery may include a primary cell that is not rechargeable, a secondary cell that is rechargeable, or a fuel cell. The power module 150 may include a power management integrated circuit (PMIC). The PMIC may supply a power that is optimized for each of the modules described above and modules to be described later. The power module 150 may include a wireless power transmission/reception member electrically connected to the battery. The wireless power transmission/reception member may include a plurality of antenna radiators that are in a form of a coil.

The electronic device 101 may further include the embedded module 160 and the external module 170. The embedded module 160 may include the sensor module 161, the antenna module 162, and the sound output module 163. The external module 170 may include the camera module 171, a light module 172, and the communication module 173.

The sensor module 161 may sense an input by a user body or an input by a pen in the first input module 131 and may generate an electrical signal or a data value corresponding to the input. The sensor module 161 may include at least one of the fingerprint sensor 161-1, the input sensor 161-2, and a digitizer 161-3.

The fingerprint sensor 161-1 may generate a data value corresponding to a user fingerprint. The fingerprint sensor 161-1 may include one of an optical fingerprint sensor or a capacitive fingerprint sensor.

The input sensor 161-2 may generate a data value corresponding to coordinate information of the input by the user body or the input by the pen. The input sensor 161-2 may generate a change in a capacitance, which is caused due to the input, in a form of a data value. The input sensor 161-2 may sense the input by the passive pen or may exchange data with the active pen.

The input sensor 161-2 may measure a biometric signal, such as blood pressure, moisture, or body fat. For example, when a body part of the user touches a sensor layer or a sensing panel without moving for a specific period of time, the input sensor 161-2 may sense the biometric signal based on a change in an electric field caused by the body part and may output information on the sensed biometric signal to the display module 140.

The digitizer 161-3 may generate a data value corresponding to the coordinate information of the input by the user or the pen. The digitizer 161-3 may generate an electromagnetic change, which is caused by the input, in a form of a data value. The digitizer 161-3 may sense the input by the passive pen or may exchange data with the active pen.

At least one of the fingerprint sensor 161-1, the input sensor 161-2, and the digitizer 161-3 may be implemented in a form of a sensor layer, which is formed on the display panel 141, through subsequent processes. The fingerprint sensor 161-1, the input sensor 161-2, and the digitizer 161-3 may be disposed above/on the display panel 141. In an embodiment, at least one (e.g., the digitizer 161-3) of the fingerprint sensor 161-1, the input sensor 161-2, and the digitizer 161-3 may be disposed below/under the display panel 141.

At least two of the fingerprint sensor 161-1, the input sensor 161-2, and the digitizer 161-3 may be integrally formed in a form of one sensing panel through the same process. When the at least two of the fingerprint sensor 161-1, the input sensor 161-2, and the digitizer 161-3 are integrally formed in a form of one sensing panel, the sensing panel may be disposed between the display panel 141 and the window disposed above/on the display panel 141. According to one embodiment, the sensing panel may be disposed on the window, and a position of the sensing panel is not specifically limited.

At least one of the fingerprint sensor 161-1, the input sensor 161-2, and the digitizer 161-3 may be embedded in the display panel 141. In other words, at least one of the fingerprint sensor 161-1, the input sensor 161-2, and the digitizer 161-3 may be simultaneously formed with the display panel 141 through a process for forming components (e.g., a light emitting element and/or a transistor) included in the display panel 141.

In addition, the sensor module 161 may generate an electrical signal or a data value corresponding to an internal state or an external state of the electronic device 101. The sensor module 161 may further include, for example but not limited to, a gesture sensor, a gyro sensor, a pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The antenna module 162 may include at least one antenna to transmit and/or receive the signal or a power to and/or from an external source. According to an embodiment, through an antenna suitable for a communication scheme, the communication module 173 may transmit a signal to an external electronic device 102 and/or may receive a signal from the external electronic device 102. An antenna pattern of the antenna module 162 may be integrated into one component (e.g., the display panel 141) of the display module 140 or the input sensor 161-2.

The sound output module 163 may output a sound signal to the outside of the electronic device 101 may include, for example, a speaker used for general purposes such as multimedia playback or recording playback and a receiver used exclusively for receiving calls. According to an embodiment, the receiver and the speaker may be either integrally or separately implemented. A sound output pattern of the sound output module 163 may be integrated into the display module 140.

The camera module 171 may capture (e.g., photograph) a still image and/or a moving image. According to one embodiment, the camera module 171 may include at least one lens, an image sensor, or an image signal processor. The camera module 171 may further include an infrared camera capable of detecting a presence or an absence of the user, a position of the user, and a line of sight of the user.

The light module 172 may provide a light. The light module 172 may include a light emitting diode or a xenon lamp. The light module 172 may operate in conjunction with the camera module 171 or may operate independently.

The communication module 173 may establish a wired or wireless communication channel between the electronic device 101 and the external electronic device 102 and may support communication execution through the established communication channel. The communication module 173 may include at least one of a wireless communication module, such as a cellular communication module, a short-range wireless communication module, or a global navigation satellite system (GNSS) communication module, and a wired communication module, such as a local area network (LAN) communication module or a power line communication module. The communication module 173 may communicate with the external electronic device 102 over a short-range communication network such as Bluetooth, Wi-Fi direct, or infrared data association (IrDA) or a long-range communication network such as a cellular network, an Internet, or a computer network (e.g., a LAN or a wide area network (WAN)). Various types of communication modules described above may be implemented into one chip or implemented in a form of separate chips.

The input module 130, the sensor module 161, and the camera module 171 may be used to control the operation of the display module 140 while operating with the processor 110.

The processor 110 may output commands or data to the display module 140, the sound output module 163, the camera module 171, or the light module 172 based on the input data received from the input module 130. For example, the processor 110 may generate image data corresponding to the input data applied through the mouse or the active pen and may output the image data to the display module 140; alternatively, the processor 110 may generate command data corresponding to the input data and may output the command data to the camera module 171 or the light module 172. When input data are not received from the input module 130 during a specific period of time, the processor 110 may switch an operating mode of the electronic device 101 to a low-power mode or a sleep mode such that the power consumption of the electronic device 101 is reduced.

The processor 110 may output commands or data to the display module 140, the sound output module 163, the camera module 171, or the light module 172 based on sensing data received from the sensor module 161. For example, the processor 110 may compare authentication data, which is obtained through the fingerprint sensor 161-1, with authentication data stored in the memory 120 and may execute an application depending on a comparison result. The processor 110 may execute a command based on the sensing data sensed by the input sensor 161-2 or the digitizer 161-3 or may output image data corresponding to the sensing data to the display module 140. When the sensor module 161 includes a temperature sensor, the processor 110 may receive temperature data about the measured temperature from the sensor module 161 and may further correct brightness of the image data based on the temperature data.

The processor 110 may receive measurement data related to the presence or absence of the user, the position of the user, and the line of sight of the user from the camera module 171. The processor 110 may further correct the brightness of the image data based on the measurement data. For example, the processor 110 that determines the presence or absence of the user through the input from the camera module 171 may output, to the display module 140, image data having brightness corrected through the data conversion circuit 112-2 or the gamma correction circuit 112-3.

Some of the above components may be connected to each other through a communication scheme between peripheral devices, for example, a bus, a general purpose input/output (GPIO), a serial peripheral interface (SPI), a mobile industry processor interface (MIPI), or a ultra-path interconnect (UPI) link and may exchange signals (e.g., commands or data). The processor 110 may communicate with the display module 140 through a specific interface. For example, one of the communication schemes described above may be used, and the present disclosure is not limited thereto.

The electronic device 101 according to various embodiments of the present disclosure may be implemented in various types of devices. The electronic device 101 may include, for example, at least one of a portable communication device (e.g., a smartphone), a computer device, a portable multimedia device, a portable medical device, a camera, a wearable device, and home appliances. The electronic device 101 according to an embodiment of the present disclosure is not limited to the above devices.

Figure 2:
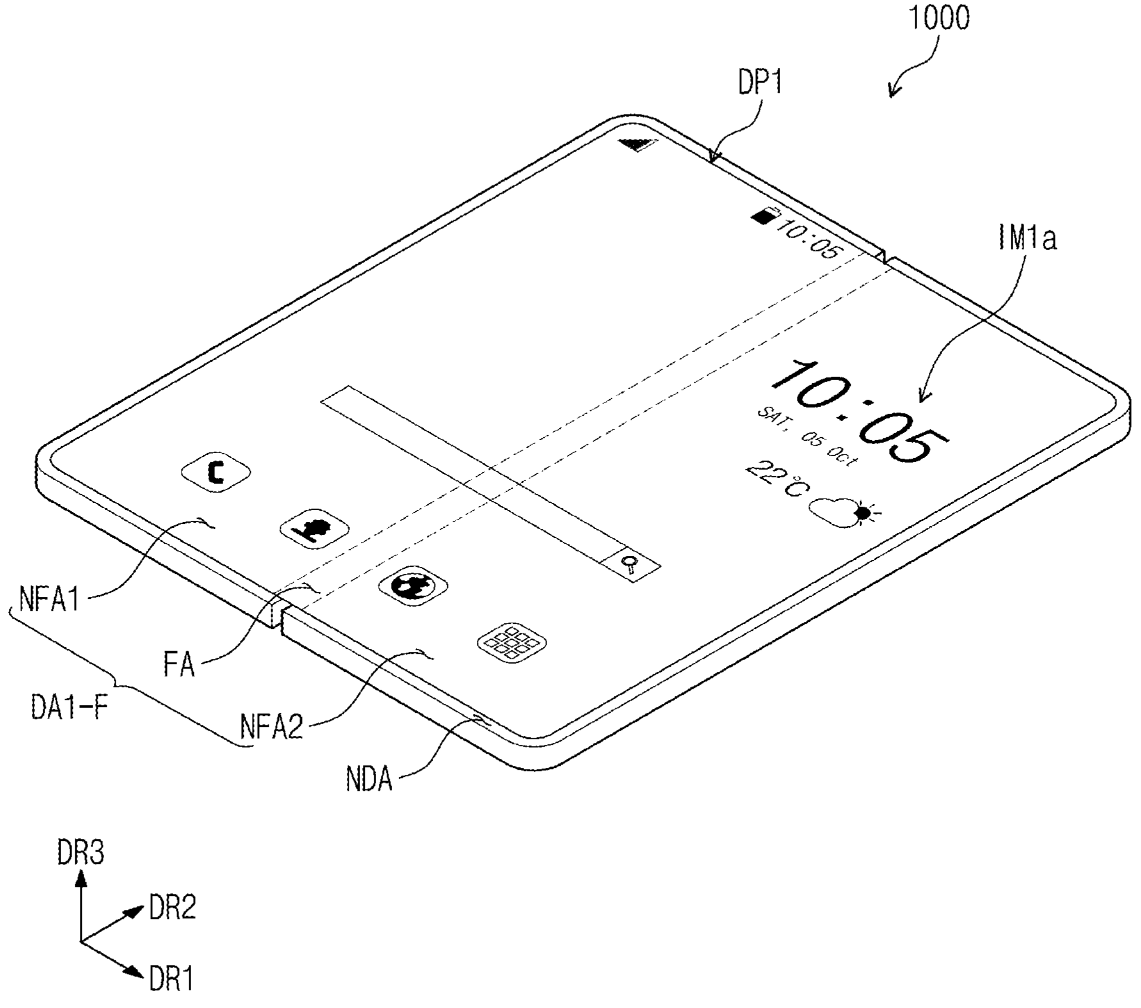
FIG. 2 is a perspective view of an electronic device according to an embodiment of the present disclosure.
Figure 3:
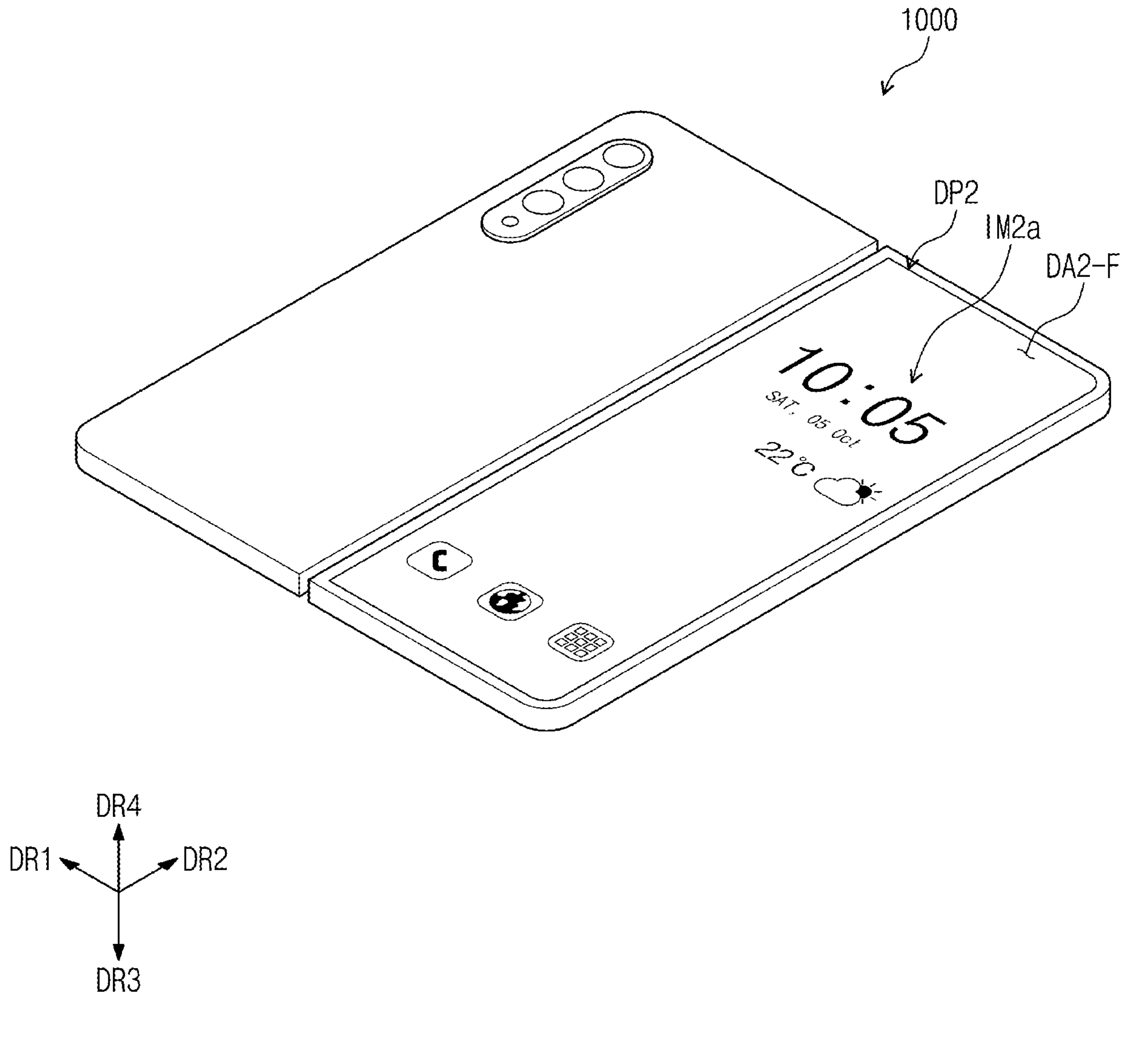
FIG. 3 is a rear perspective view illustrating an electronic device according to an embodiment of the present disclosure.

FIG. 2 is a perspective view of an electronic device according to an embodiment of the present disclosure, and FIG. 3 is a rear perspective view of an electronic device according to an embodiment of the present disclosure.

Referring to FIGS. 2 and 3, an electronic device 1000 may be activated in response to an electrical signal. For example, the electronic device 1000 may display an image.

The electronic device 1000 may include a first display panel DP1 and a second display panel DP2. The first display panel DP1 and the second display panel DP2 may be individual panels separated from each other. The first display panel DP1 may be referred to as a main display panel, and the second display panel DP2 may be an auxiliary display panel or an external display panel.

The first display panel DP1 may include a first display unit DA1-F and the second display panel DP2 may include a second display unit DA2-F. The second display panel DP2 may have an area smaller than an area of the first display panel DP1. A size of the first display unit DA1-F, which corresponds to a size of the first display panel DP1, may be larger than a size of the second display unit DA2-F, which corresponds to a size of the second display panel DP2.

The first display unit DA1-F may have a plane substantially parallel to a plane defined by a first direction DR1 and a second direction DR2, when the electronic device 1000 is unfolded. A thickness direction of the electronic device 1000 may be parallel to a third direction DR3 crossing the first direction DR1 and the second direction DR2. Accordingly, front surfaces (or top/upper surfaces) and rear surfaces (or bottom/lower surfaces) of members included in the electronic device 1000 may be defined based on the third direction DR3.

The first display panel DP1 or the first display unit DA1-F may include a folding region FA being folded or unfolded, and a plurality of non-folding regions NFA1 and NFA2 spaced from each other with the folding region FA interposed between the non-folding regions NFA1 and NFA2. The second display panel DP2 may overlap with any one of the plurality of non-folding regions NFA1 and NFA2. For example, the second display panel DP2 may overlap the first non-folding region NFA1.

A display direction of a first image IM1*a* which is displayed on a portion (for example, the first non-folding region NFA1) of the first display panel DP1, may be opposite to a display direction of a second image IM2*a* which is displayed on the second display panel DP2. For example, the first image IM1*a* may be displayed in the third direction DR3, and the second image IM2*a* may be displayed in a fourth direction DR4 opposite to the third direction DR3.

According to an embodiment of the present disclosure, the folding region FA may be bent around a folding axis extending in a direction (for example, a direction parallel to the second direction DR2) parallel to a longer side (or edge) of the electronic device 1000. The folding region FA may have a specific curvature and a specific radius of a curvature, when the electronic device 1000 is folded. When the electronic device 1000 is folded, the first non-folding region NFA1 and the second non-folding region NFA2 may face each other, and the electronic device 1000 may be in an inner-folding state, such that the first display unit DA1-F is not exposed to an outside.

According to an embodiment of the present disclosure, when the electronic device 1000 is folded, the electronic device 1000 may be in an outer-folding state such that the first display unit DA1-F is exposed to the outside. According to an embodiment of the present disclosure, the electronic device 1000 may be in the inner-folding state or the outer-folding state transitioning from a state in which the electronic device 1000 is unfolded, and the present disclosure is not limited thereto.

FIG. 2 illustrates that one folding region FA is defined (provided or included) in the electronic device 1000, but the present disclosure is not limited thereto. For example, a plurality of folding axes and a plurality of folding regions corresponding to the plurality of folding axes may be defined in the electronic device 1000, and the electronic device 1000 may be in the inner-folding state or the outer-folding state in each of the plurality of folding regions.

Figure 4:
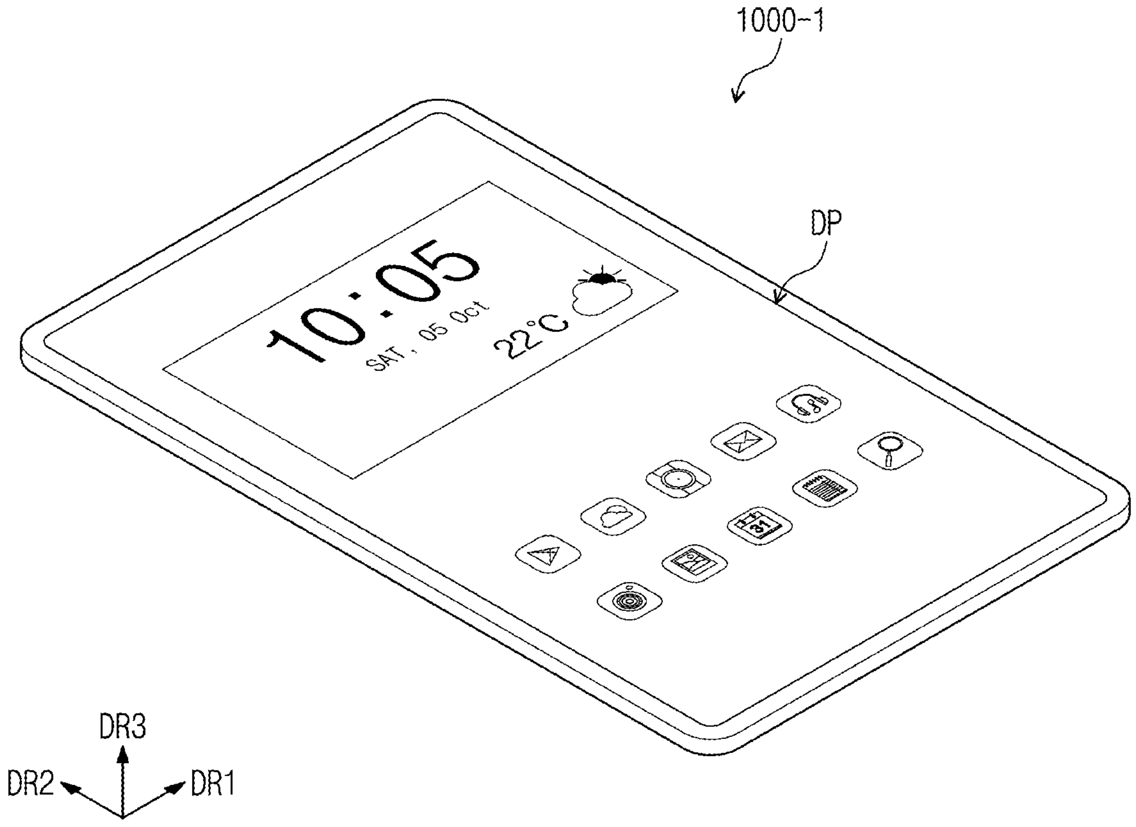
FIG. 4 is a perspective view illustrating an electronic device according to an embodiment of the present disclosure.
Figure 5:
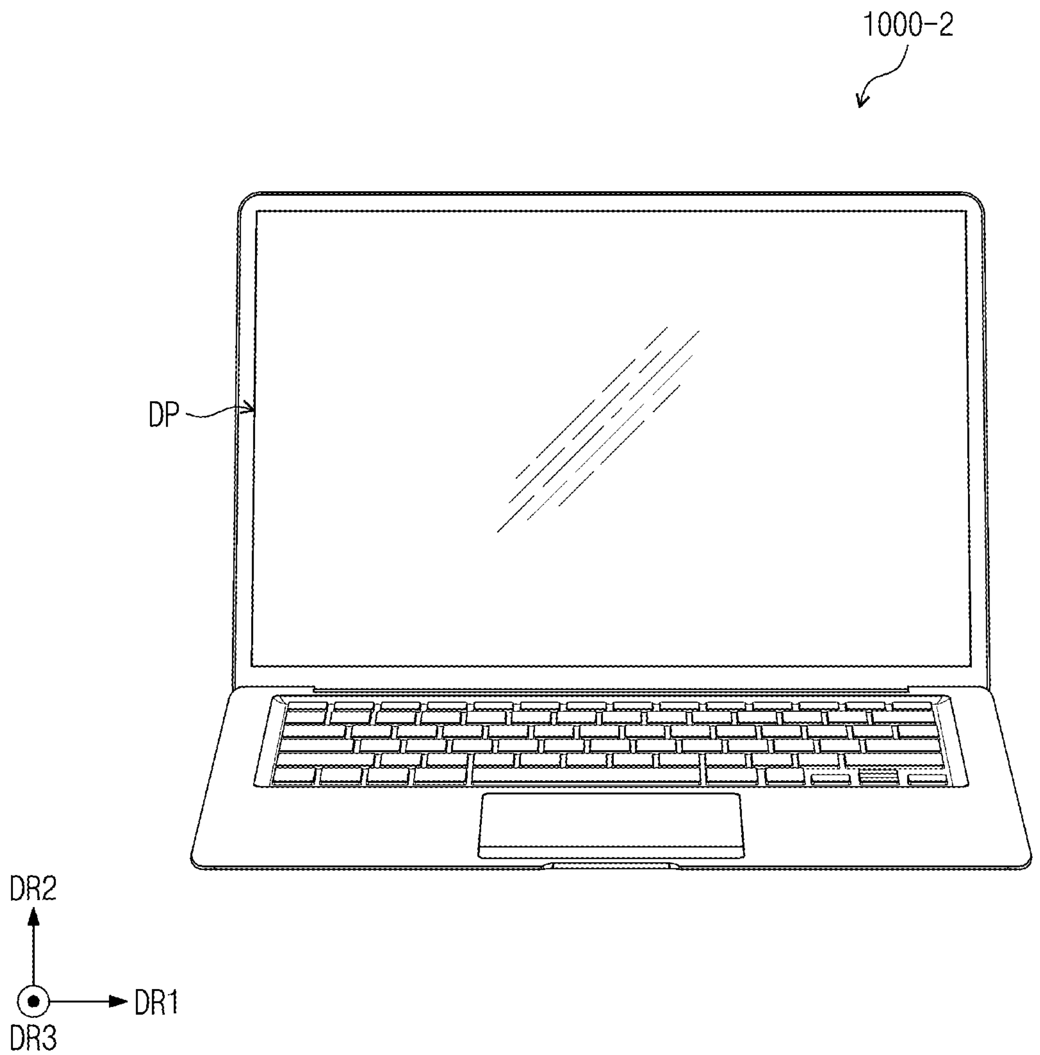
FIG. 5 is a perspective view illustrating an electronic device according to an embodiment of the present disclosure.

FIG. 4 is a perspective view of an electronic device according to an embodiment of the present disclosure, and FIG. 5 is a perspective view of an electronic device according to an embodiment of the present disclosure.

FIG. 4 illustrates that an electronic device 1000-1 according to an embodiment is a tablet PC, and the electronic device 1000-1 may include the display panel DP. FIG. 5 illustrates that an electronic device 1000-2 according to an embodiment is a laptop computer, and the electronic device 1000-2 may include the display panel DP.

Figure 6:
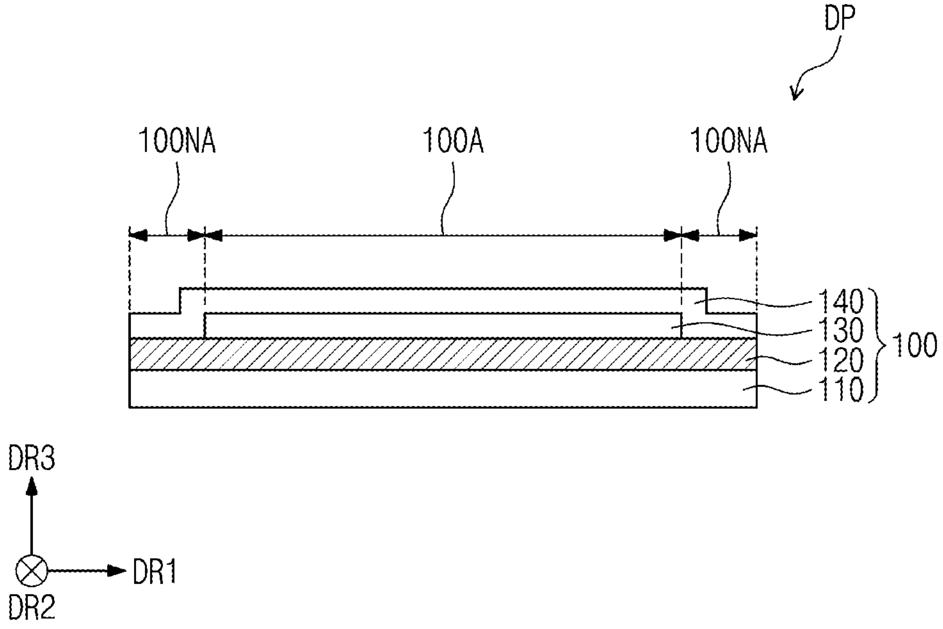
FIG. 6 is a cross-sectional view schematically illustrating a display panel according to an embodiment of the present disclosure.

FIG. 6 is a cross-sectional view schematically illustrating a display panel according to an embodiment of the present disclosure.

Referring to FIG. 6, the display panel DP may include a display layer 100. The display layer 100 may be a component which substantially generates an image. The display layer 100 may be a light emitting display layer. For example, the display layer 100 may be an organic light emitting display layer, an inorganic light emitting display layer, an organic-inorganic light emitting display layer, a quantum dot display layer, a micro-light emitting diode (LED) display layer, or a nano-LED display layer. The display panel DP may include a display region 100A and a peripheral region 100NA adjacent to the display region 100A. The peripheral region 100NA may surround the display region 100A. The display layer 100 may include a base layer 110, a circuit layer 120, a light emitting element layer 130, and an encapsulating layer 140.

The base layer 110 may be a member which provides a base surface on which the circuit layer 120 is disposed. The base layer 110 may have a multi-layer structure or a single-layer structure. The base layer 110 may be implemented with a glass substrate, a metal substrate, a silicon substrate, or a polymer substrate, but the present disclosure is not limited thereto.

The circuit layer 120 may be disposed on the base layer 110. The circuit layer 120 may include an insulating layer, a semiconductor pattern, a conductive pattern, and a signal line. The insulating layer, the semiconductor layer, and the conductive layer may be formed on the base layer 110 through a coating or deposition process, and may be selectively patterned through a plurality of photolithography processes.

The light emitting element layer 130 may be disposed on the circuit layer 120. The light emitting element layer 130 may include a light emitting element. For example, the light emitting element layer 130 may include an organic light emitting material, an inorganic light emitting material, an organic-inorganic light emitting material, a quantum dot, a quantum rod, a micro-LED, or a nano-LED.

The encapsulating layer 140 may be disposed on the light emitting element layer 130. The encapsulating layer 140 may protect the light emitting element layer 130 from a foreign substance such as moisture, oxygen, and a dust particle.

Figure 7:
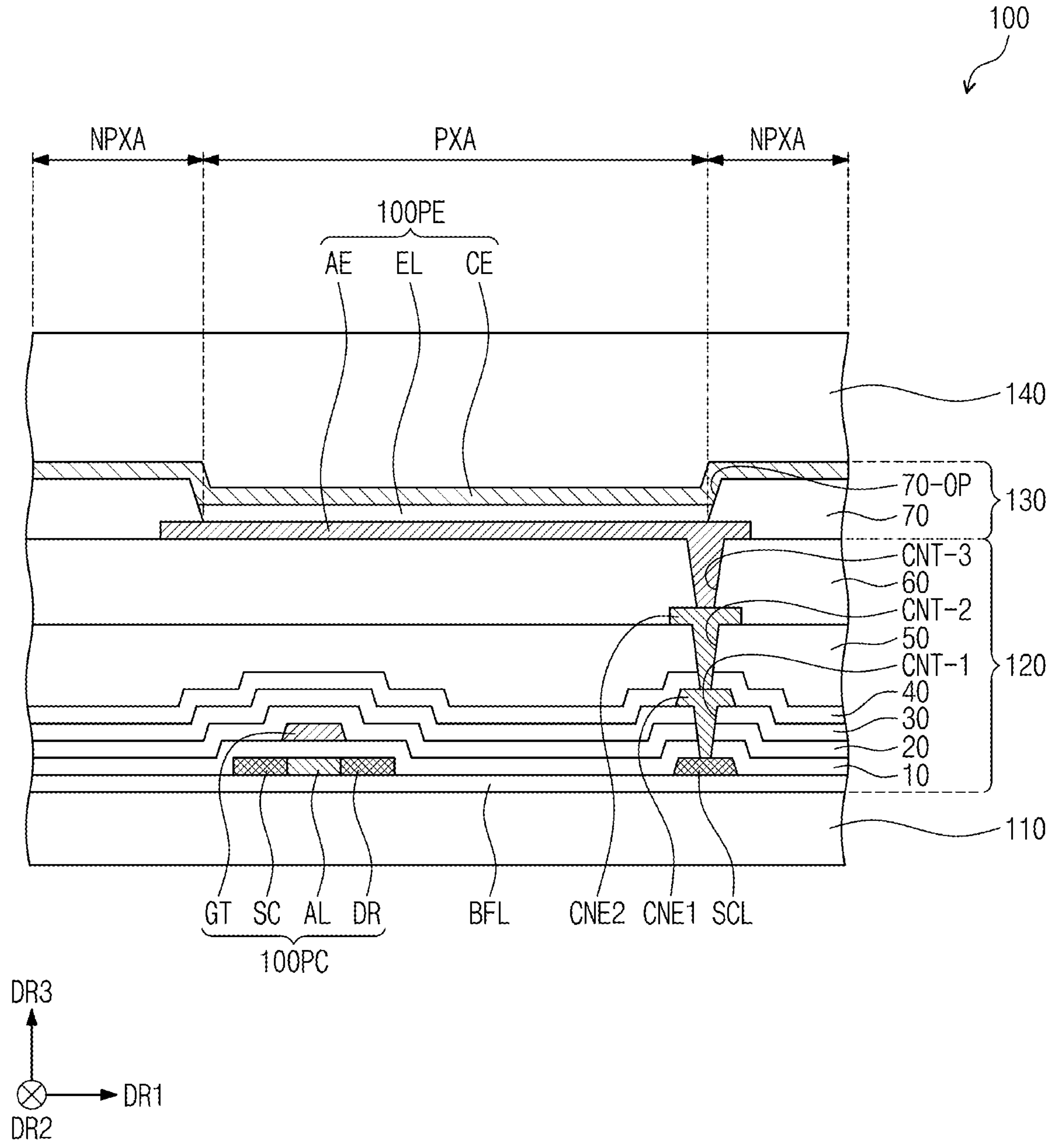
FIG. 7 is a cross-sectional view of a display layer according to an embodiment of the present disclosure.

FIG. 7 is a cross-sectional view of a display layer according to an embodiment of the present disclosure. In the following description made with reference to FIG. 7, the components that are described with reference to FIG. 6 are assigned with the same reference numerals, and the details thereof will be omitted.

Referring to FIG. 7, at least one buffer layer BFL may be formed on a top surface of the base layer 110. The buffer layer BFL may improve a bonding force between the base layer 110 and the semiconductor pattern. The buffer layer BFL may be formed in a multi-layer structure. Alternatively, the display layer 100 may further include a barrier layer. The buffer layer BFL may include at least one of silicon oxide, silicon nitride, and silicon oxynitride. For example, the buffer layer BFL may include a structure in which a silicon oxide layer and a silicon nitride layer are stacked alternately.

A semiconductor pattern (SC, AL, DR, and SCL) may be disposed on the buffer layer BFL. The semiconductor pattern (SC, AL, DR, and SCL) may include polysilicon. However, the present disclosure is not limited thereto. For example, the semiconductor pattern (SC, AL, DR, and SCL) may include amorphous silicon, low-temperature polycrystalline silicon, or an oxide semiconductor.

FIG. 7 illustrates merely a portion of the semiconductor pattern (SC, AL, DR, and SCL), and the semiconductor pattern (SC, AL, DR, and SCL) may be further disposed in any other region. The semiconductor patterns (SC, AL, DR, and SCL) may be arranged across pixels in compliance with a specific rule. The semiconductor pattern (SC, AL, DR, and SCL) may have various electrical properties depending on a doping state. The semiconductor pattern (SC, AL, DR, and SCL) may include a first region (SC, DR, and SCL) having higher conductivity and a second region AL having lower conductivity. The first region (SC, DR, and SCL) may be doped with an N-type dopant or a P-type dopant. A P-type transistor may include a region doped with the P-type dopant, and an N-type transistor may include a region doped with the N-type dopant. The second region (AL) may be a non-doped region or a region doped at a concentration lower than a concentration of the first regions (SC, DR, and SCL).

The conductivity of the first region (SC, DR, and SCL) may be greater than the conductivity of the second region (AL) and may substantially serve as an electrode or a signal line. The second region (AL) may substantially correspond to an active region AL (or channel) of a transistor 100PC. In other words, a portion (AL) of the semiconductor pattern (SC, AL, DR, and SCL) may be the active region AL of the transistor 100PC, another portion (SC, and DR) of the semiconductor pattern (SC, AL, DR, and SCL) may be a source region SC or a drain region DR of the transistor 100PC, and still another portion (SCL) of the semiconductor pattern (SC, AL, DR, and SCL) may be a connection electrode or a connection signal line SCL.

Each of pixels may have an equivalent circuit including a plurality of transistors, at least one capacitor, and at least one light emitting element, and the equivalent circuit of a pixel may be modified in various forms. FIG. 7 illustrates that a pixel includes one transistor 100PC and one light emitting element 100PE, which are included in the pixel.

The source region SC, the active region AL, and the drain region DR of the transistor 100PC may be formed from the semiconductor pattern (SC, AL, DR, and SCL). The source region SC and the drain region DR may extend in directions opposite to each other from the active region AL when viewed in a cross-sectional view. A portion of the connection signal line SCL formed from the semiconductor pattern (SC, AL, DR, and SCL) is illustrated in FIG. 7. Although not separately illustrated, the connection signal line SCL may be connected to the drain region DR of the transistor 100PC when viewed in a plan view.

A first insulating layer 10 may be disposed on the buffer layer BFL. The first insulating layer 10 may overlap with a plurality of pixels in common to cover the semiconductor pattern (SC, AL, DR, and SCL). The first insulating layer 10 may be an inorganic layer and/or an organic layer and may have a single-layer structure or multi-layer structure. The first insulating layer 10 may include, for example but not limited to, at least one of an aluminum oxide, a titanium oxide, a silicon oxide, a silicon nitride, a silicon oxynitride, a zirconium oxide, or hafnium oxide. According to an embodiment, the first insulating layer 10 may be a silicon oxide layer in a single layer. An insulating layer of the circuit layer 120, which is to be described later, as well as the first insulating layer 10, may be an inorganic layer and/or an organic layer, and may have a single-layer structure or a multi-layer structure. The inorganic layer may include at least one of the above-described materials, and the present disclosure is not limited thereto.

The gate GT of the transistor 100PC may be disposed on the first insulating layer 10. The gate GT may be a portion of a metal pattern. The gate GT may overlap with the active region AL. The gate GT may function as a mask in the process of doping or reducing the semiconductor pattern (SC, AL, DR, and SCL).

A second insulating layer 20 may be disposed on the first insulating layer 10 to cover the gate GT. The second insulating layer 20 may overlap with the pixels in common. The second insulating layer 20 may be an inorganic layer and/or an organic layer and may have a single-layer structure or multi-layer structure. The second insulating layer 20 may include, for example but not limited to, at least one of a silicon oxide, a silicon nitride, or silicon oxynitride. According to an embodiment, the second insulating layer 20 may have a multi-layer structure including a silicon oxide layer and a silicon nitride layer.

A third insulating layer 30 may be disposed on the second insulating layer 20. The third insulating layer 30 may have a single-layer structure or a multi-layer structure. For example, the third insulating layer 30 may have a multi-layer structure including a silicon oxide layer and a silicon nitride layer.

A first connection electrode CNE1 may be disposed on the third insulating layer 30. The first connection electrode CNE1 may be connected to the connection signal line SCL through a contact hole CNT-1 formed through the first, second, and third insulating layers 10, 20, and 30.

A fourth insulating layer 40 may be disposed on the third insulating layer 30. The fourth insulating layer 40 may be a silicon oxide layer in a single layer. A fifth insulating layer 50 may be disposed on the fourth insulating layer 40. The fifth insulating layer 50 may be an organic layer.

A second connection electrode CNE2 may be disposed on the fifth insulating layer 50. The second connection electrode CNE2 may be connected to the first connection electrode CNE1 through a contact hole CNT-2 formed through the fourth insulating layer 40, and the fifth insulating layer 50.

A sixth insulating layer 60 may be disposed on the fifth insulating layer 50 to cover the second connection electrode CNE2. The sixth insulating layer 60 may be an organic layer.

The light emitting element layer 130 may be disposed on the circuit layer 120. The light emitting element layer 130 may include the light emitting element 100PE. For example, the light emitting element layer 130 may include an organic light emitting material, an inorganic light emitting material, an organic-inorganic light emitting material, a quantum dot, a quantum rod, a micro-LED, or a nano-LED. The following description will be described regarding the light emitting element 100PE which is an organic light emitting element, by way of example, but the present disclosure is not specifically limited thereto.

The light emitting element 100PE may include a first electrode AE, a light emitting layer EL, and a second electrode CE.

The first electrode AE may be disposed on the sixth insulating layer 60. The first electrode AE may be connected to the second connection electrode CNE2 through a contact hole CNT-3 formed through the sixth insulating layer 60. The first electrode AE may be referred to as an anode AE.

A pixel defining layer 70 may be disposed on the sixth insulating layer 60 to cover a portion of the first electrode AE. An opening 70-OP may be defined in the pixel defining layer 70. The opening 70-OP in the pixel defining layer 70 may expose at least a portion of the first electrode AE.

The first display unit DA1-F (see FIG. 2) may include an emission region PXA and a non-emission region NPXA adjacent to the emission region PXA. The non-emission region NPXA may surround the emission region PXA. According to an embodiment, the emission region PXA may be defined to correspond to a partial region of the first electrode AE exposed by the opening 70-OP.

The light emitting layer EL may be disposed on the first electrode AE. The light emitting layer EL may be disposed in a region corresponding to the opening 70-OP. Although FIG. 7 illustrates that the light emitting layer EL is disposed in the opening 70-OP, the present disclosure is not limited thereto. For example, the light emitting layer EL may extend to cover a side surface of the pixel defining layer 70 and a portion of a top surface of the pixel defining layer 70, which define the opening 70-OP.

According to an embodiment of the present disclosure, the light emitting layer EL may be independently formed with respect to each of pixels. When the light emitting layer EL is independently formed with respect to each of the pixels, each of the light emitting layers EL may emit a light having at least one of a blue color, a red color, and a green color. However, the present disclosure is not limited thereto. For example, the light emitting layer EL may be connected to the pixels in common. In this case, the light emitting layer EL may provide a blue light or may provide a white light.

The second electrode CE may be disposed on the light emitting layer EL. The second electrode CE may have an integrated shape and may be included in a plurality of pixels in common. The second electrode CE may be referred to as a cathode CE.

According to an embodiment of the present disclosure, a hole control layer may be interposed between the first electrode AE and the light emitting layer EL. The hole control layer may be disposed in common in the emission region PXA and the non-emission region NPXA. The hole control layer may include a hole transport layer and may further include a hole injection layer. An electron control layer may be interposed between the light emitting layer EL and the second electrode CE. The electron control layer may include an electron transport layer and may further include an electron injection layer. The hole control layer and the electron control layer may be formed in the plurality of pixels in common by using an open mask or an ink-jet process.

The encapsulating layer 140 may be disposed on the light emitting element layer 130. The encapsulating layer 140 may include an inorganic layer, an organic layer, and an inorganic layer sequentially stacked, and layers included in the encapsulating layer 140 are not limited thereto. The inorganic layers may protect the light emitting element layer 130 from moisture and oxygen, and the organic layer may protect the light emitting element layer 130 from a foreign material such as a dust particle. The inorganic layers may include, for example but not limited to, a silicon nitride layer, a silicon oxynitride layer, a silicon oxide layer, a titanium oxide layer, or an aluminum oxide layer. The organic layer may include an acrylic-based organic layer, but the present disclosure is not limited thereto.

Figure 8:
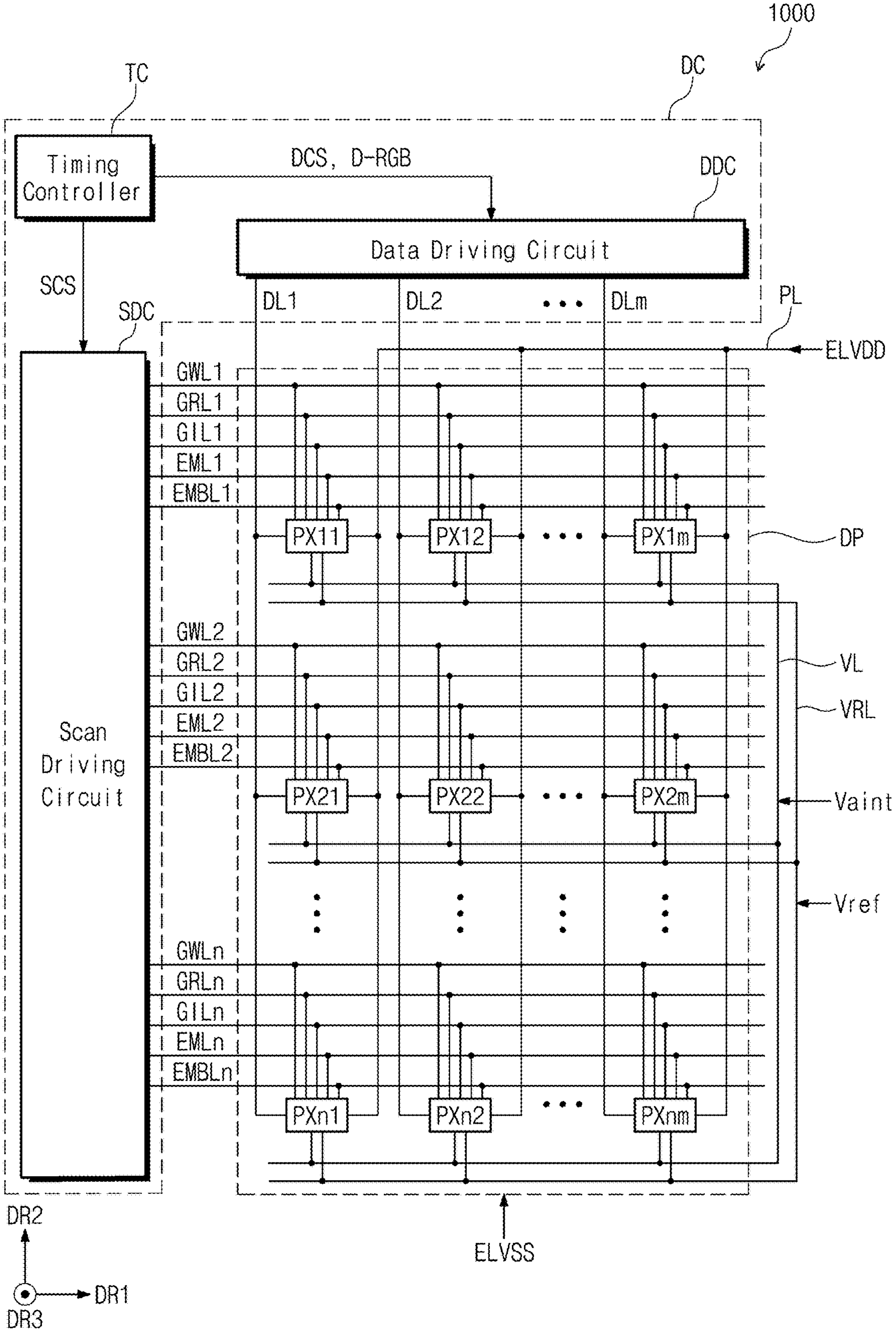
FIG. 8 is a block diagram illustrating an electronic device according to an embodiment of the present disclosure.

FIG. 8 is a block diagram of an electronic device according to an embodiment of the present disclosure.

Referring to FIG. 8, the electronic device 1000 may include the display panel DP and a driving controller DC.

The driving controller DC may include a timing controller TC, a scan driving circuit SDC, and a data driving circuit DDC.

The timing controller TC may receive image signals and a control signal from an outside. The timing controller TC may generate image data D-RGB by converting a data format of the image signals to meet a specification of an interface with the data driving circuit DDC. The timing controller TC may convert the control signal to generate a scan control signal SCS and a data control signal DCS. The timing controller TC may output the image data D-RGB, the data control signal DCS, and the scan control signal SCS.

The scan driving circuit SDC may receive the scan control signal SCS from the timing controller TC. The scan control signal SCS may include a vertical start signal for starting an operation of the scan driving circuit SDC, a clock signal for determining an output timing of signals. The scan driving circuit SDC may generate a plurality of first scan signals, a plurality of second scan signals, and a plurality of third scan signals. The scan driving circuit SDC may output the plurality of first scan signals to a plurality of first scan lines GWL1 to GWLn, output the plurality of second scan signals to a plurality of second scan lines GIL1 to GILn, and output the plurality of third scan signals to a plurality of third scan lines GRL1 to GRLn.

In addition, the scan driving circuit SDC may generate a plurality of first light emitting control signals and a plurality of second light emitting control signals, in response to the scan control signal SCS. The scan driving circuit SDC may output the plurality of first light emitting control signals to a plurality of first light emitting lines EML1 to EMLn, and output the plurality of second light emitting control signals to a plurality of second light emitting lines EMBL1 to EMBLn.

Although FIG. 8 illustrates that the plurality of first to third scan signals and the plurality of first and second light emitting control signals are output from one scan driving circuit SDC, the present disclosure is not limited thereto. According to an embodiment of the present disclosure, the driving controller DC may include a plurality of scan driving circuits SDC. The plurality of scan driving circuits SDC may output the plurality of first to third scan signals and the plurality of the first and second light emitting control signals, respectively. In addition, according to an embodiment of the present disclosure, the scan driving circuit SDC may include a driving circuit, which generates and outputs the plurality of first to third scan signals, and a driving circuit which generates and outputs the plurality of first and second light emitting control signals.

The data driving circuit DDC may receive the data control signal DCS and the image data D-RGB from the timing controller TC. The data driving circuit DDC may convert the image data D-RGB to data voltages and may output the data voltages to a plurality of data lines DL1 to DLm to be described later. The data voltages may be analog voltages corresponding to grayscale values of the image data D-RGB.

The display panel DP may include the plurality of first scan lines GWL1 to GWLn, the plurality of second scan lines GIL1 to GILn, the plurality of third scan lines GRL1 to GRLn, the plurality of first light emitting lines EML1 to EMLn, the plurality of second light emitting lines EMBL1 to EMBLn, the plurality of data lines DL1 to DLm, a first power line PL, a first voltage line VRL, a second voltage line VL, and a plurality of pixels PX11 to PXnm. The first scan lines GWL1 to GWLn, the second scan lines GIL1 to GILn, the third scan lines GRL1 to GRLn, the first light emitting lines EML1 to EMLn, and the second light emitting lines EMBL1 to EMBLn may extend in the first direction DR1, and may be arranged in the second direction DR2 crossing the first direction DR1.

The data lines DL1 to DLm may be insulated from the first scan lines GWL1 to GWLn, the second scan lines GIL1 to GILn, the third scan lines GRL1 to GRLn, the first light emitting lines EML1 to EMLn, and the second light emitting lines EMBL1 to EMBLn while crossing the first scan lines GWL1 to GWLn, the second scan lines GIL1 to GILn, the third scan lines GRL1 to GRLn, the first light emitting lines EML1 to EMLn, and the second light emitting lines EMBL1 to EMBLn. The plurality of pixels PX11 to PXnm may be connected to relevant ones among the scan lines GWL1 to GWLn, GRL1 to GRLn, and GIL1 to GILn. A connection relationship between the pixels PX11 to PXnm and the scan lines GWL1 to GWLn, GRL1 to GRLn, and GIL1 to GILn may vary depending on a configuration of a driving circuit of the plurality of pixels PX11 to PXnm.

The first power line PL may receive a first driving voltage ELVDD. The first voltage line VRL may receive a first initializing voltage Vref. The second voltage line VL may receive a second initializing voltage Vaint. The first voltage line VRL may receive the first driving voltage ELVDD. The second initializing voltage Vaint may have a voltage level lower than a voltage level of the first driving voltage ELVDD. A second driving voltage ELVSS may be applied to the display panel DP. The second driving voltage ELVSS may have a voltage level lower than a voltage level of the first driving voltage ELVDD. The first initializing voltage Vref may have a voltage level higher than a voltage level of the second initializing voltage Vaint.

Although the electronic device 1000 according to an embodiment has been described with respect to FIG. 8, the electronic device 1000 according to an embodiment of the present disclosure is not limited thereto. Depending on a configuration of the pixel, additional scan lines may be further included, in addition to the scan lines GWL1 to GWLn, GIL1 to GILn, and GRL1 to GRLn, in the electronic device 1000 or scan lines among the scan lines GWL1 to GWLn, GIL1 to GILn, and GRL1 to GRLn may be omitted from the electronic device 1000. In addition, the connection relationship between the pixels PX11 to PXnm and the scan lines GWL1 to GWLn, GRL1 to GCLn, and GIL1 to GILn may be changed.

The plurality of pixels PX11 to PXnm may include multiple groups of pixels including light emitting elements OLED (see FIG. 9) that emit mutually different color lights. For example, the multiple groups of pixels may include red pixels that generate red color lights, green pixels that generate green color lights, and blue pixels that generate blue color lights. A light emitting element of the red pixel, a light emitting element of the green pixel, and a light emitting element of the blue pixel may respectively include light emitting layers including different materials.

Each of the plurality of pixels PX11 to PXnm may include a plurality of transistors and at least one capacitor electrically connected with a transistor. The details thereof will be described later. At least one of the scan driving circuit SDC and the data driving circuit DDC may include a plurality of transistors formed through a process the same as a process for a pixel driving circuit.

The above-described scan lines GWL1 to GWLn, GIL1 to GILn, and GRL1 to GRLn, the plurality of pixels PX11 to PXnm, the scan driving circuit SDC, and the data driving circuit DDC may be formed on a base substrate through a plurality of photolithography processes.

Figure 9:
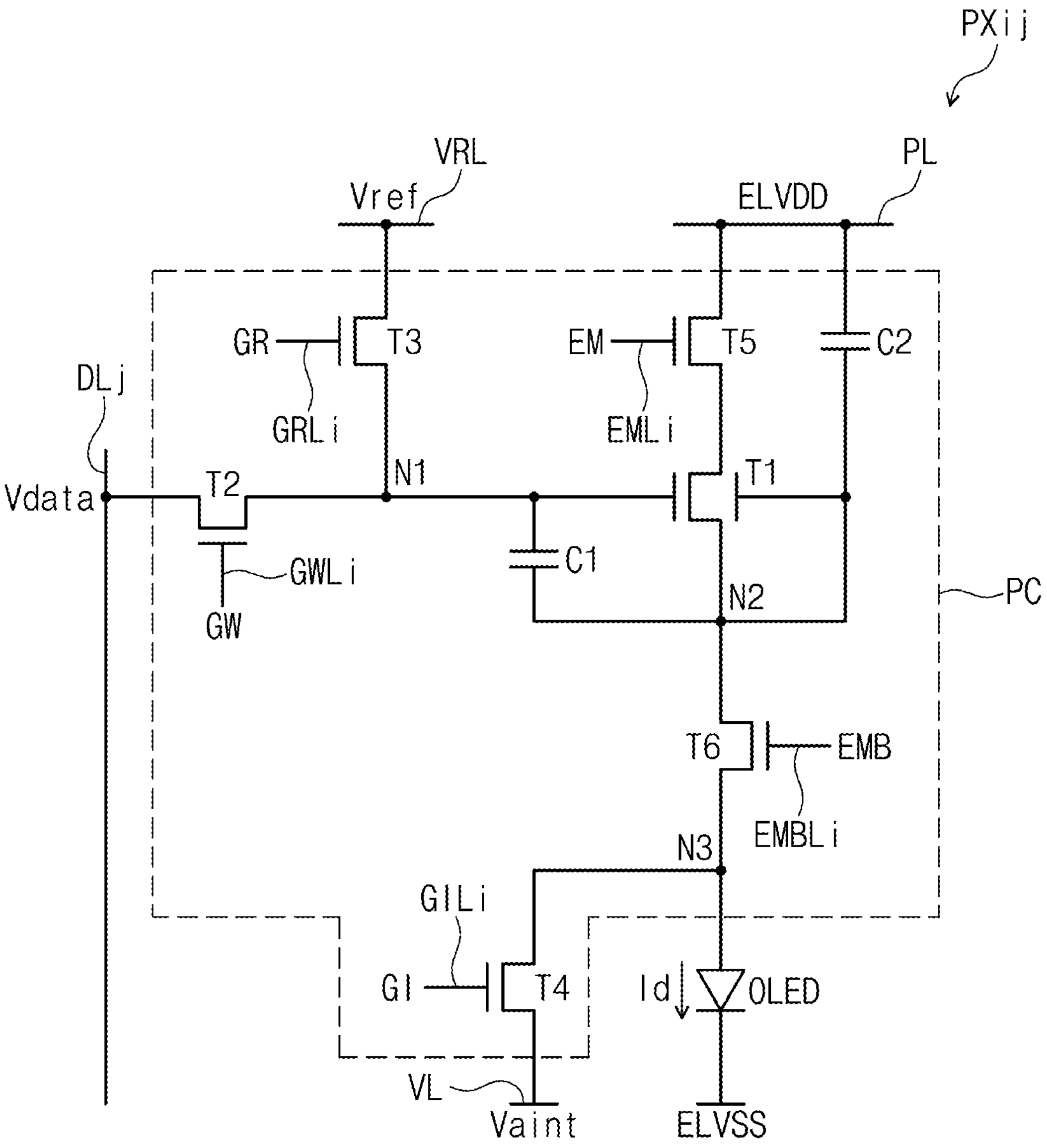
FIG. 9 is an equivalent circuit diagram of a pixel according to an embodiment of the present disclosure.

FIG. 9 is an equivalent circuit diagram of a pixel according to an embodiment of the present disclosure.

A pixel PXij illustrated in FIG. 9 may be an embodiment of each of the plurality of pixels PX11 to PXnm illustrated in FIG. 8.

Referring to FIG. 9, the pixel PXij may be connected to a j-th data line (or a data line) DLj among the data lines DL1 to DLm, an i-th first scan line (or a first scan line) GWLi among the first scan lines GWL1 to GWLn, an i-th second scan line (or a second scan line) GILi among the second scan lines GIL1 to GILn, an i-th third scan line (or a third scan line) among the third scan lines GRL1 to GRLn, an i-th first light emitting line (or a first light emitting line) EMLi among the first light emitting lines EML1 to EMLn, and an i-th second light emitting line (or a second light emitting line) EMBLi among the second light emitting lines EMBL1 to EMBLn. In this case, 'i' and 'j' are natural numbers.

The pixel PXij may be connected to the first scan line GWLi to transmit a first scan signal GW, the second scan line GILi to transmit a second scan signal GI, a third scan line GRLi to transmit a third scan signal GR, the first light emitting line EMLi to transmit a first light emitting control signal EMB, the second light emitting line EMBLi to transmit a second light emitting control signal EMB, and a data line DLj to transmit a data voltage Vdata. In addition, the pixel PXij may be connected to the first power line PL to transmit the first driving voltage ELVDD, the first voltage line VRL to transmit the first initializing voltage Vref, and the second voltage line VL to transmit the second initializing voltage Vaint.

The pixel PXij may include a light emitting element OLED and a pixel driving circuit PC. For example, the light emitting element OLED may be an organic light emitting element including an organic light emitting layer. The pixel driving circuit PC may be connected to the light emitting element OLED to control an amount of a current flowing through the light emitting element OLED, and the light emitting element OLED may generate a light having a specific brightness depending on an amount of the current provided thereto.

According to an embodiment of the present disclosure, the pixel PXij may have a 6T2C structure. That is, the pixel PXij may include six transistors and two capacitors.

Each of a first transistor to a sixth transistor T1, T2, T3, T4, T5, and T6 may be an N-type transistor having a semiconductor layer including an oxide semiconductor. However, this is provided only for the illustrative purpose. For example, the semiconductor layer according to an embodiment of the present disclosure is not limited thereto, and may include amorphous silicon, low-temperature polycrystalline silicon (LTPS), or crystalline silicon. The first to sixth transistors T1, T2, T3, T4, T5, and T6 implemented in an N-type may have a less change in a device characteristic or a less instantaneous afterimage. However, this is provided only for the illustrative purpose. For example, all of the first to sixth transistors T1, T2, T3, T4, T5, and T6 may be P-type transistors. According to an embodiment, at least one of the first to sixth transistors T1, T2, T3, T4, T5, and T6 may be an N-type transistor, and remaining transistors of the first to sixth transistors T1, T2, T3, T4, T5, and T6 may be a P-type transistor.

The first transistor T1 may be electrically connected between the first power line PL and a second node N2. The first transistor T1 may include a first gate electrode connected to a first node N1, a first electrode electrically connected to the first power line PL to receive the first driving voltage ELVDD, and a second electrode connected to the second node N2. The first electrode may be connected to the first power line PL through a fifth transistor T5. The second electrode may be connected to a third node N3 through the sixth transistor T6. The first transistor T1 may further include a second gate electrode connected to the second node N2. The first gate electrode and the second gate electrode may be disposed in mutually different layers to face each other. The first transistor T1 may receive the data voltage Vdata depending on a switching operation of a second transistor T2 to control an amount of a driving current Id flowing through the light emitting element OLED. The first transistor T1 may be referred to as a driving transistor.

The second transistor T2 may be connected between the data line DLj and the first node N1. The second transistor T2 may include a gate electrode connected to the first scan line GWLi to receive the first scan signal GW, a first electrode connected to the data line DLj, and a second electrode connected to the first node N1. The second transistor T2 may be turned on in response to the first scan signal GW to electrically connect the data line DLj to the first node N1, and transmit the data voltage Vdata transmitted to the data line DLj to the first node N1. The second transistor T2 may be referred to as a switching transistor.

A third transistor T3 may be connected between the first gate electrode of the first transistor T1 and the first voltage line VRL. The third transistor T3 may include a gate electrode connected to the third scan line GRLi to receive the third scan signal GR, a first electrode connected to the first voltage line VRL to receive the first initializing voltage Vref, and a second electrode connected to the first node N1. The third transistor T3 may be turned on in response to the third scan signal GR received through the third scan line GRLi to transmit the first initializing voltage Vref, which is received through the first voltage line VRL, to the first node N1. The third transistor T3 may be referred to as a reset transistor.

A fourth transistor T4 may be electrically connected between the first power line VL and the third node N3. The fourth transistor T4 may include a gate electrode connected to the second scan line GILi to receive the second scan signal GI, a first electrode connected to a third node N3, and a second electrode connected to the second voltage line VL to receive the second initializing voltage Vaint. The fourth transistor T4 may be turned on in response to the second scan signal GI received through the second scan line GILi to transmit the second initializing voltage Vaint, which is received through the second voltage line VL, to the third node N3. The fourth transistor T4 may be referred to as an initializing transistor.

The fifth transistor T5 may be connected between the first power line PL and the first transistor T1. The fifth transistor T5 may include a gate electrode connected to the first light emitting line EMLi to receive the first light emitting control signal EM, a first electrode connected to the first power line PL, and a second electrode connected to the first electrode of the first transistor T1. The fifth transistor T5 may be turned on or off depending on the first emitting control signal EM received through the first light emitting line EMLi. The fifth transistor T5 may be referred to as a first light emitting transistor.

The sixth transistor T6 may be connected between the first transistor T1 and the light emitting element OLED. The sixth transistor T6 may include a gate electrode connected to the second light emitting line EMBLi to receive the second light emitting control signal EMB, a first electrode connected to the second node N2, and a second electrode connected to the third node N3. The sixth transistor T6 may be turned on or off depending on the second light emitting control signal EMB received through the second light emitting line EMBLi. The sixth transistor T6 may be referred to as a second light emitting transistor.

The first capacitor C1 may be connected between the first node N1 and the second node N2. The first capacitor C1 may include a first electrode and a second electrode. The first electrode of the first capacitor C1 may be connected to the first gate electrode of the first transistor T1, and the second electrode of the first capacitor C1 may be connected to the second electrode of the first transistor T1. The first capacitor C1 may store a voltage corresponding to a threshold voltage the data signal. The first capacitor C1 may be referred to as a storage capacitor.

The second capacitor C2 may be connected between the first power line PL and the second node N2. The second capacitor C2 may include a first electrode and a second electrode. The first electrode of the second capacitor C2 may be connected to the first power line PL. The second electrode of the second capacitor C2 may be connected to the second gate electrode of the first transistor T1 and the second electrode of the first capacitor C1. The second capacitor C2 may have a capacitance less than a capacitance of the first capacitor C1. The second capacitor C2 may be referred to as a hold capacitor.

The light emitting element OLED may be electrically connected to the first transistor T1. The light emitting element OLED may include the first electrode AE (see FIG. 7) connected to the third node N3 and the second electrode CE (see FIG. 7) facing the first electrode AE (see FIG. 7). The second electrode CE (see FIG. 7) may receive the second driving voltage ELVSS. The second electrode CE (see FIG. 7) may be a common electrode common to the plurality of pixels PX11 to PXnm (see FIG. 8).

Figure 10:
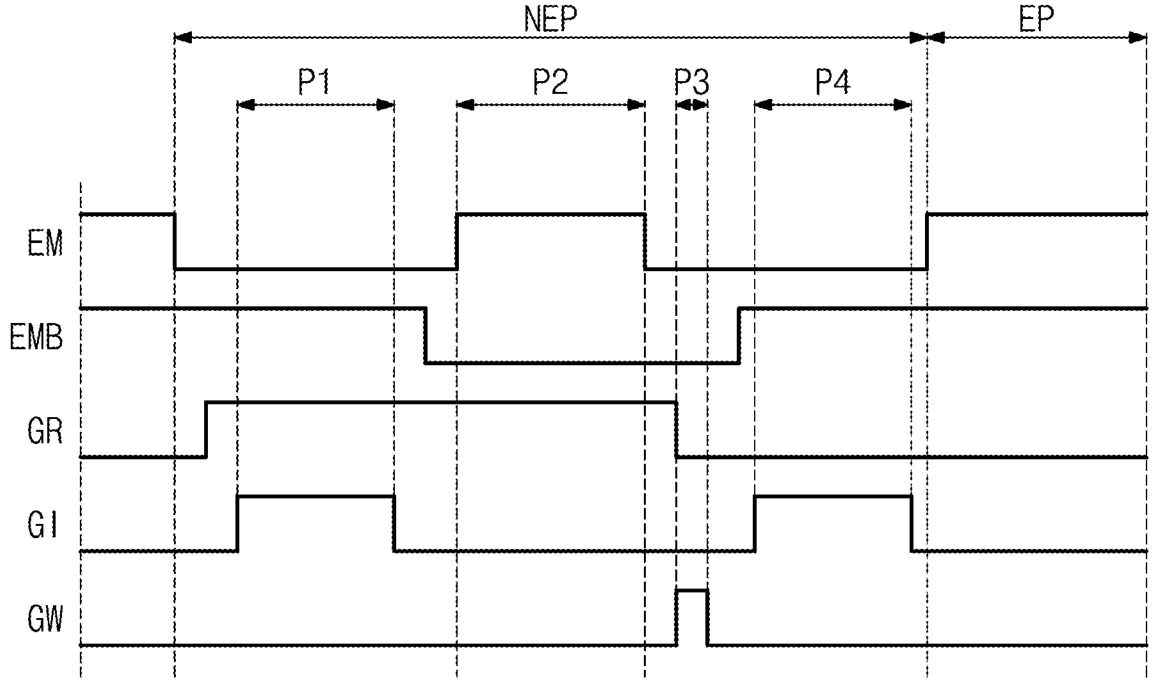
FIG. 10 is a timing diagram of signals for describing an operation of a pixel according to an embodiment of the present disclosure.

FIG. 10 is a waveform diagram of signals for describing an operation of a pixel according to an embodiment of the present disclosure.

Referring to FIGS. 8 to 10, the display panel DP may operate in a unit of a frame period. The pixel PXij may operate in a non-emission period NEP and an emission period EP for every frame period. The non-emission period NEP may include a first initializing period P1, a compensating period P2, a write period P3, and a second initializing period P4.

Each of the first scan signal GW, the second scan signal GI, the third scan signal GR, the first light emitting control signal EM, and the second light emitting control signal EMB may have a high level voltage for some periods and a low level voltage for some periods. In this case, the high level voltage may be a turn-on voltage for turning on a transistor, and the low level voltage may be a turn-off voltage for turning off a transistor.

In the first initializing period P1, the second scan signal GI having the turn-on voltage may be provided to the second scan line GILi, the third scan signal GR having the turn-on voltage may be provided to the third scan line GRLi, and the second light emitting control signal EMB having the turn-on voltage may be provided to the second light emitting line EMBLi. The first scan signal GW and the first light emitting control signal EM may have turn-off voltages in the first initializing period P1.

The fourth transistor T4 may be turned on in response to the second scan signal GI having the turn-on voltage, the third transistor T3 may be turned on in response to the third scan signal GR having the turn-on voltage, and the sixth transistor T6 may be turned on in response to the second light emitting control signal EMB having the turn-on voltage.

The gate electrode of the first transistor T1 may be initialized with the first initializing voltage Vref by the third transistor T3 which is turned on.

The first electrode AE (see FIG. 7) of the light emitting element OLED may be initialized with the second initializing voltage Vaint by the fourth transistor T4, which is turned on, and the second node N2 may be initialized with the second initializing voltage Vaint by the sixth transistor T6 which is turned on.

In the compensating period P2, the third scan signal GR having the turn-on voltage may be provided to the third scan line GRLi, and the first light emitting control signal EM having the turn-on voltage may be provided to the first light emitting line EMLi. The first scan signal GW, the second scan signal GI, and the second light emitting control signal EMB may have turn-off voltages in the compensating period P2.

The third transistor T3 may be turned on in response to the third scan signal GR having the turn-on voltage, and the fifth transistor T5 may be turned on in response to the first light emitting control signal EM having the turn-on voltage. The second transistor T2, the fourth transistor T4, and the sixth transistor T6 may be turned off, in response to the first scan signal GW, the second scan signal GI, and the second light emitting control signal EMB having the turn-off voltages.

The first initializing voltage Vref may be provided to the first gate electrode of the first transistor T1 by the third transistor T3, which is turned on, and the first driving voltage ELVDD may be provided to the first electrode of the first transistor T1 to turn on the first transistor T1.

When a voltage across the second electrode of the first transistor T1 is dropped to a difference (Vref-Vth) between the first initializing voltage Vref and a threshold voltage Vth of the first transistor T1, the first transistor T1 may be turned off. The first capacitor C1 may be charged with a voltage corresponding to the threshold voltage Vth of the first transistor T1 to compensate for the threshold voltage Vth of the first transistor T1.

In a comparative example, when the sixth transistor T6 is omitted, a current output from the first transistor T1 may flow to the light emitting element OLED during the compensating period P2 to charge a capacitor of the light emitting element OLED. Accordingly, a capacitor charging difference of the light emitting element OLED and/or a charging difference of the light emitting element OLED, which results from a change in an impedance change due to a deterioration of the light emitting element OLED, may occur during the compensating period P2. Accordingly, a difference in an image brightness may be generated, which causes an image stain. However, according to the present disclosure, the pixel PXij may include the sixth transistor T6. As the sixth transistor T6 is turned off in the compensating period P2, the first transistor T1 may be electrically disconnected from the light emitting element OLED in the compensating period P2. Therefore, the charging difference of the light emitting element OLED may not occur in the compensating period P2, and thus, the difference in the image brightness may be prevented. Accordingly, the electronic device 1000 having improved display quality may be provided.

The first scan signal GW having the turn-on voltage may be provided to the first scan line GWLi in the write period P3. Each of the second scan signal GI, the third scan signal GR, the first light emitting control signal EM, and the second light emitting control signal EMB may have the turn-off voltage.

The second transistor T2 may be turned on in response to the first scan signal GW having the turn-on voltage, in the write period P3. The third to sixth transistors T3, T4, T5, and T6 may be turned off in the write period P3.

The second transistor T2, which is turned on, may provide the data voltage Vdata, which is received from the data line DLj, to the first node N1 (that is, the first gate electrode of the first transistor T1).

In the second initializing period P4, the second scan signal GI having the turn-on voltage may be provided to the second scan line GILi, and the second light emitting control signal EMB having the turn-on voltage may be provided to the second light emitting line EMBLi. The first scan signal GW, the third scan signal GR, and the first light emitting control signal EM may have turn-off voltages in the second initializing period P4.

The sixth transistor T6 may be turned on in response to the second light emitting control signal EMB having the turn-on voltage, to connect the first electrode AE (see FIG. 7) of the light emitting element OLED to the second node N2 (the second electrode of the first transistor T1), and the fourth transistor T4 may be turned on in response to the second scan signal GI having the turn-on voltage, to initialize the first electrode AE (see FIG. 7) of the light emitting element OLED with the second initializing voltage Vaint.

In the emission period EP, the first light emitting control signal EM and the second light emitting control signal EMB may have turn-on voltages, and the first scan signal GW, the second scan signal GI, and the third scan signal GR may have turn-off voltages.

The second to fourth transistors T2, T3, and T4 may be turned off in response to the first scan signal GW, the second scan signal GI, and the third scan signal GR having the turn-off voltages, and the fifth transistor T5 and the sixth transistor T6 may be turned on in response to the first light emitting control signal EM and the second light emitting control signal EMB having the turn-on voltages.

The first transistor T1 may output a driving current Id having an intensity corresponding to a voltage stored in the first capacitor C1. The light emitting element OLED may emit a light having a brightness corresponding to the intensity of the driving current Id regardless of the threshold voltage Vth of the first transistor T1.

Figure 11:
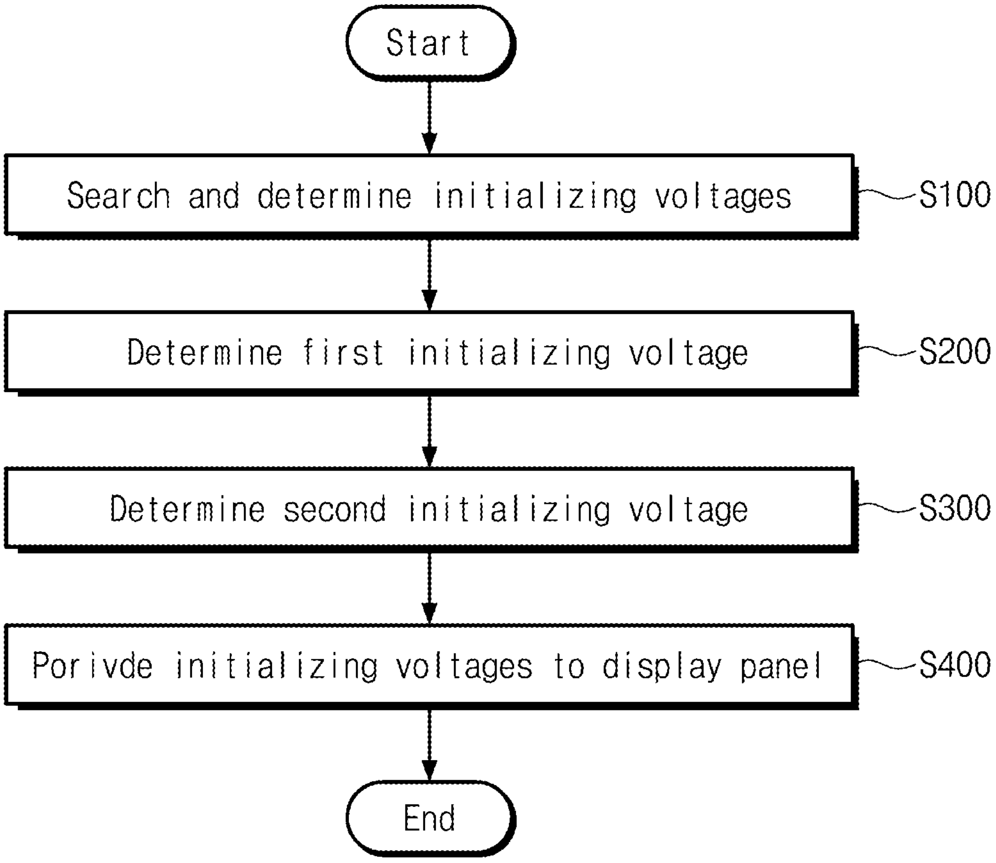
FIG. 11 is a flowchart illustrating a method for operating an electronic device according to an embodiment of the present disclosure.

FIG. 11 is a flowchart illustrating a method for driving an electronic device according to an embodiment of the present disclosure.

Referring to FIGS. 8 to 11, the display panel DP may operate based on a plurality of brightness characteristics. The plurality of brightness characteristics may be defined as a light emitting brightness of the display panel DP that exhibits when the data voltage Vdata provided to the pixel PXij corresponds to a maximum grayscale value.

The plurality of brightness characteristics may include a first brightness characteristic and a second brightness characteristic different from the first brightness characteristic. The second brightness characteristic may have a lower brightness than that of the first brightness characteristic, at 0-255 grayscale levels.

For example, the first brightness characteristic may be defined as '100'. This may indicate that the light emitting brightness of the display panel DP is 100 nits at a grayscale level of 255. The first brightness characteristic may be referred to as a high display brightness value (DBV). The second brightness characteristic may be defined as '4'. This may indicate that the light emitting brightness of the display panel DP is 4 nits at a grayscale level of 255. The second brightness characteristic may be referred to as a low DBV.

A failure of copy mura (or mura phenomenon), such as a horizontal/vertical stripe stain, in a panel may be measured through a specific test pattern expressing black or white in the second brightness characteristic. The failure of copy mura may be caused when a swing of the data voltage Vdata exerts a coupling influence on the first node N1. For example, when a potential difference between the data voltage Vdata and the first initializing voltage Vref is increased, the coupling influence may be increased.

To improve the display quality of the electronic device 1000, the first initializing voltage Vreft needs to be optimized in the second brightness characteristics.

In addition, temperature luminance sensibility (TLS) and temperature color sensibility (TCS) may be employed as indexes for evaluating the display panel DP in the second brightness characteristic.

The temperature luminance sensibility (TLS) may be an index for determining whether a brightness is constantly maintained even if a temperature is changed, that is, whether the brightness is not changed (or substantially changed) due to a change in temperature, and may be determined by measuring a degree of a brightness change of a panel when the temperature is changed.

The temperature color sensibility (TCS) may be an index for determining whether a color is consistently maintained even if a temperature is changed, that is, whether color distortion may not occur due to a temperature change, and may be determined by measuring a color change of a panel depending on a temperature change.

In the second brightness characteristic, the temperature luminance sensibility (TLS) and the temperature color sensibility (TCS) may be influenced by the second initializing voltage Vaint for initializing the first electrode AE (see FIG. 7) of the light emitting element OLED. To improve the display quality of the electronic device 1000, the second initializing voltage Vaint needs to be optimized in the second brightness characteristic.

In a method for driving the electronic device 1000 according to an embodiment of the present disclosure, the first initializing voltage Vref and the second initializing voltage Vaint may be determined to be optimized.

The method for driving the electronic device 1000 may include searching for and determining an initializing voltage provided to the first gate electrode of the first transistor T1 in the first brightness characteristic (S100), determining the first initializing voltage Vreft by compensating for the initializing voltage based on a specific margin voltage (S200), determining the second initializing voltage Vaint based on the first initializing voltage Vreft and a specific driving condition (S300), and providing the first initializing voltage Vreft and the second initializing voltage Vaint to the display panel DP (S400).

An initializing voltage for the display panel DP, which is manufactured in each of a plurality of cell regions defined in a working substrate, may be individually determined through searching (S100). The initializing voltage may be provided through the first voltage line VRL. The initializing voltage may be a voltage for initializing the first node N1.

A voltage level of the initializing voltage may be determined as a voltage level at a specific brightness for expressing black by the display panel DP, in the first brightness characteristic. In other words, the initializing voltage may be referred to as an initializing voltage for ensuring a black brightness in the first brightness characteristic. For example, the black brightness may be less than or equal to 20 micro-nits (unit). In other words, when a light emitting brightness of the display panel DP is 100 nits in the grayscale level of 255, a voltage for ensuring the black brightness of 20 micro-nits (unit) to express black may be determined to the initializing voltage. For example, the initializing voltage obtained through searching may be determined to 0.9 V.

The initializing voltage may be compensated based on the specific margin voltage to determine the first initializing voltage Vreft (S200). The specific margin voltage may be determined based on a degradation margin to ensure reliability.

In other words, the first initializing voltage Vreft, the specific margin voltage, and the initializing voltage Vref may satisfy Equation 1. In this case, the initializing voltage may be referred to "Vref".

$$Vref = Vref' + \text{margin voltage} \qquad \text{Equation 1}$$

The specific margin voltage may range from 0.1 V to 0.5 V. For example, the margin voltage may be 0.3 V.

For example, the first initializing voltage Vreft to be provided to the display panel DP may be determined to 1.2 V which is obtained by adding the specific margin voltage of 0.3 V to the initializing voltage of 0.9 V obtained through searching.

The second initializing voltage Vaint may be determined based on the first initializing voltage Vreft and the specific driving condition (S300). The specific driving condition may have a predetermined voltage (or a predetermined voltage range).

In other words, the first initializing voltage Vreft, the second initializing voltage Vaint, and the specific driving condition may satisfy following Equation 2.

$$Vref = Vaint \geq \text{predetermined voltage} \qquad \text{Equation 2}$$

A value (or voltage level), which is obtained by subtracting the second initializing voltage Vaint from the first initializing voltage Vreft, may satisfy a value (or voltage level) greater than or equal to a value (or voltage level) according to the driving condition (e.g., a specific value based on the predetermined voltage range of the driving condition). When the value, which is obtained by subtracting the second initializing voltage Vaint from the first initializing voltage Vreft, is less than the value of the driving condition, the light emitting element OLED may not be initialized. The driving condition may have a voltage level ranging from 1.5 V to 2.0 V. For example, the driving condition may have the voltage level of 1.8 V.

The second initializing voltage Vaint may be previously determined based on the temperature luminance sensibility (TLS) and the temperature color sensibility (TCS).

When the first initializing voltage Vreft and the second initializing voltage Vaint, which is previously determined, satisfy Equation 2, the second initializing voltage Vaint may be set to a value previously determined.

When the first initializing voltage Vreft and the second initializing voltage Vaint, which is previously determined, fail to satisfy Equation 2, a value (or voltage level) obtained by subtracting the value of the driving condition from the first initializing voltage Vreft may be determined as the second initializing voltage Vaint. For example, when the first initializing voltage Vref is 1.2 V, the second initializing voltage Vaint may be −0.6 V.

In the method for driving the electronic device 1000 according to an embodiment of the present disclosure, the first initializing voltage Vref determined S200 may have a positive voltage level and the second initializing voltage Vaint determined in S300 may have a negative voltage level.

The first initializing voltage Vreft and the second initializing voltage Vaint may be provided to the display panel DP (S400).

TABLE 1

| | | Comparative example | Embodiment |
|---|---|---|---|
| Driving condition | Vaint_R/B/G@100DBV | −0.5/−0.5/−0.5 | −0.6/−0.6/−0.6 |
| | Vaint_R/B/G@10DBV | −1/−1.25/0.5 | −1/−1.25/0.5 |
| TLS | 100DBV 7G(0.04 nits) | −0.28 | −0.30 |
| | 10DBV 21G(0.04 nits) | 3.77 | 3.75 |
| TCS | 100DBV 7G(0.04 nits) | 0.0428 | 0.0378 |
| | 10DBV 21G(0.04 nits) | 0.0302 | 0.0309 |
| Copy Mura | 100DBV_white | 1.2 | 1.16 |
| | 100DBV_Black | 1.9 | 1.31 |
| | 10DBV_white | 1.6 | 0.96 |
| | 10DBV_Black | 2.2 | 1.96 |

Table 1 shows measurement values of the temperature luminance sensibility (TLS), the temperature color sensibility (TCS), and copy mura according to a comparative example and an embodiment, which are measured in the first brightness characteristic (100 DBV) and the second brightness characteristic (10 DBV). Referring to Table 1, the measurement values according to the comparative example are obtained using the second initializing voltage Vaint determined through a related art method, and the measurement values according to an embodiment of the present disclosure are obtained using the second initializing voltage Vaint determined by using the method for driving the electronic device 1000.

Unlike the present disclosure, the second initializing voltage Vaint according to the comparative example is previously determined based on the temperature luminance sensibility (TLS) and the temperature color sensibility (TCS), and thus the second initializing voltage Vaint is not changed. For example, second initializing voltages Vaint of a red pixel, a green pixel, and a blue pixel may be −0.5 V/−0.5 V/−0.5 V, respectively, in the first brightness characteristic (100 DBV).

The first initializing voltage Vreft according to the comparative example may be determined to 1.3 V to satisfy the specific driving condition based on Equation 2. According to the manner according to the comparative example, the potential difference between the data voltage Vdata and the first initializing voltage Vreft may be relatively increased.

The first initializing voltage Vreft and the second initializing voltage Vaint in the second brightness characteristic (10 DBV) may be determined based on the first initializing voltage Vreft and the second initializing voltage Vaint determined in the first brightness characteristic (100 DBV). Copy mura may be worsened by the data voltage Vdata and the first initializing voltage Vreft having the increased potential difference.

However, the second initializing voltages Vaint of the red pixel, the green pixel, and the blue pixel in the first brightness characteristic (100 DBV), which are determined by using the method for driving the electronic device 1000 according to an embodiment of the present disclosure, may be −0.6 V/−0.6 V/−0.6 V, respectively, and the first initializing voltage Vreft in the first brightness characteristic (100 DBV) may have a (1-1)-th voltage level. For example, the first initializing voltage Vreft may be determined to 1.2 V.

In the second brightness characteristic (10 DBV), the first initializing voltage Vreft may be determined to have a (1-2)-th voltage level different from the (1-1)-th voltage level, based on the (1-1)-th voltage level. In other words, the first initializing voltage Vreft and the second initializing voltage Vaint in the second brightness characteristic (10 DBV) may be determined based on the first initializing voltage Vreft and the second initializing voltage Vaint determined in the first brightness characteristic (100 DBV).

The temperature color sensibility (TCS) and the temperature luminance sensibility (TLS) may be measured to similar levels according to the comparative example and an embodiment. In other words, even if the second initializing voltage Vaint in the first brightness characteristic (100 DBV) is determined by using the method for driving the electronic device 1000 according to an embodiment of the present disclosure, an influence by the second initializing voltage Vaint on the temperature luminance sensibility (TLS) and the temperature color sensibility (TCS) may be insignificant.

Copy mura is measured with respect to each of specific test patterns expressing black or white in the first brightness characteristic (100 DBV) and the second brightness characteristic (10 DBV). In this case, a lower measurement value of copy mura may indicate improvement in copy mura.

According to the present disclosure, the potential difference between the data voltage Vdata and the first initializing voltage Vreft may be reduced, as compared with the comparative example. According to the comparative example and an embodiment, copy mura may be improved by about 0.2%. Accordingly, the electronic device 1000 having improved display quality and the method for driving the electronic device 1000 may be provided.

In addition, according to the present disclosure, in the method for driving the electronic device 1000, the first initializing voltage Vreft may be determined to a value ensuring the black brightness in the first brightness characteristic (100 DBV), and a reliability margin of the first initializing voltage Vreft may be ensured based on Equation 1. The second initializing voltage Vaint may be determined based on Equation 2. Accordingly, the temperature luminance sensibility (TLS) and the temperature color sensibility (TCS) may be improved, and a characteristic of copy mura may be improved in the second brightness characteristic (10 DBV). Accordingly, the electronic device 1000 having improved display quality and the method for driving the electronic device 1000 may be provided.

As described above, according to the method for driving the electronic device, the first initializing voltage may be determined to a value ensuring the black brightness in the first brightness characteristic, and the reliability margin of the first initializing voltage may be ensured based on the margin voltage. The second initializing voltage may be determined based on the driving condition. Accordingly, the temperature luminance sensibility and the temperature color sensibility may be improved, and the characteristic of copy mura may be improved in the second brightness characteristic. Accordingly, the electronic device having improved display quality and the method for driving the electronic device may be provided.

Although an embodiment of the present disclosure has been described for illustrative purposes, those skilled in the art will appreciate that various modifications, and substitutions are possible, without departing from the scope and spirit of the present disclosure as disclosed in the accompanying claims. Accordingly, the technical scope of the preset disclosure is not limited to the detailed description of this specification, but should be defined by the claims.

While the present disclosure has been described with reference to example embodiments thereof, it will be apparent to those of ordinary skill in the art that various changes and modifications may be made thereto without departing from the spirit and scope of the present disclosure as set forth in the following claims.

What is claimed is:

1. An electronic device comprising:

a display panel comprising a plurality of pixels, wherein at least one pixel of the plurality of pixels comprises:

a light emitting element; and a pixel driving circuit connected to the light emitting element, wherein the pixel driving circuit comprises:

a first transistor comprising a gate electrode connected to a first node, a first electrode connected to a first power line to provide a first driving voltage, and a second electrode connected to a second node;

a second transistor comprising a gate electrode connected to a first scan line to provide a first scan signal, a first electrode connected to a data line, and a second electrode connected to the first node;

a first capacitor connected between the first node and the second node;

a second capacitor connected between the first power line and the second node;

a third transistor comprising a gate electrode connected to a second scan line to provide a second scan signal different from the first scan signal, a first electrode connected to a first voltage line to provide a first initializing voltage, and a second electrode connected to the first node; and a fourth transistor comprising a gate electrode connected to a third scan line to provide a third scan signal different from the first scan signal and the second scan signal, a first electrode connected to the light emitting element, and a second electrode connected to a second voltage line to provide a second initializing voltage, wherein the first initializing voltage is determined by determining a voltage level with respect to a threshold light emitting brightness to express black in a first brightness characteristic based on the voltage level that initializes the first node, and compensating for the voltage level, based on a margin voltage, the first brightness characteristic indicating an intensity of a light emitting brightness of the display panel at a preset grayscale level, and wherein the second initializing voltage is determined based on the first initializing voltage and a driving condition.

2. The electronic device of claim 1, wherein the margin voltage is in a range from 0.1 V to 0.5 V.

3. The electronic device of claim 1, wherein the second initializing voltage has a voltage level obtained by subtracting a voltage level of the driving condition from a voltage level of the first initializing voltage.

4. The electronic device of claim 1, wherein a voltage level of the driving condition is in a range from 1.5 V to 2.0 V.

5. The electronic device of claim 1, wherein the first initializing voltage has a voltage level higher than a voltage level of the second initializing voltage.

6. The electronic device of claim 1, wherein the first initializing voltage has a positive voltage level, and the second initializing voltage has a negative voltage level, in the first brightness characteristic.

7. The electronic device of claim 1, wherein the first initializing voltage has a first voltage level in the first brightness characteristic, and wherein the first initializing voltage has a second voltage level different from the first voltage level, in a second brightness characteristic having a brightness lower than a brightness of the first brightness characteristic for a same grayscale level.

8. A pixel driving circuit comprising:

a first transistor comprising a gate electrode connected to a first node, a first electrode electrically connected to a first power line to provide a first driving voltage, and a second electrode connected to a second node;

a second transistor comprising a gate electrode connected to a first scan line to provide a first scan signal, a first electrode connected to a data line, and a second electrode connected to the first node;

a first capacitor connected between the first node and the second node;

a second capacitor connected between the first power line and the second node;

a third transistor comprising a gate electrode connected to a second scan line to provide a second scan signal different from the first scan signal, a first electrode connected to a first voltage line to provide a first initializing voltage, and a second electrode connected to the first node; and a fourth transistor comprising a gate electrode connected to a third scan line to provide a third scan signal different from the first scan signal and the second scan signal, a first electrode connected to a third node, and a second electrode connected to a second voltage line to provide a second initializing voltage, wherein the first initializing voltage is determined by determining a voltage level with respect to a threshold light emitting brightness to express black in a first brightness characteristic based on the voltage level that initializes the first node, and compensating for the voltage level, based on a margin voltage, the first brightness characteristic indicating an intensity of a light emitting brightness at a preset grayscale level, and wherein the second initializing voltage is determined based on the first initializing voltage and a driving condition.

9. The pixel driving circuit of claim 8, wherein the margin voltage is in a range from 0.1 V to 0.5 V.

10. The pixel driving circuit of claim 8, wherein the second initializing voltage has a voltage level obtained by subtracting a voltage level of the driving condition from a voltage level of the first initializing voltage.

11. The pixel driving circuit of claim 8, wherein a voltage level of the driving condition is in a range from 1.5 V to 2.0 V.

12. The pixel driving circuit of claim 8, wherein the first initializing voltage has a voltage level higher than a voltage level of the second initializing voltage.

13. The pixel driving circuit of claim 8, wherein the first initializing voltage has a positive voltage level, and the second initializing voltage has a negative voltage level.

14. The pixel driving circuit of claim 8, wherein the first initializing voltage has a first voltage level in the first brightness characteristic, and wherein the first initializing voltage has a second voltage level different from the first voltage level, in a second brightness characteristic having a brightness lower than a brightness of the first brightness characteristic for a same grayscale level.

* * * * *